(12) United States Patent
Rotole et al.

(10) Patent No.: US 10,179,604 B2
(45) Date of Patent: *Jan. 15, 2019

(54) CHARGE PRESSURE CIRCUIT ARRANGEMENT FOR STEERING CONTROL FOR A VEHICLE

(71) Applicant: Deere & Company, Moline, IL (US)

(72) Inventors: David V Rotole, Bloomfield, IA (US); Thomas D Bebernes, Ottumwa, IA (US); Thomas A Nichols, Eldon, IA (US); Kyle R Teach, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 107 days.

This patent is subject to a terminal disclaimer.

(21) Appl. No.: 15/183,485

(22) Filed: Jun. 15, 2016

(65) Prior Publication Data
US 2016/0288826 A1    Oct. 6, 2016

Related U.S. Application Data

(63) Continuation of application No. 14/455,734, filed on Aug. 8, 2014, now Pat. No. 9,421,999.

(51) Int. Cl.
| | |
|---|---|
| *B60K 17/30* | (2006.01) |
| *A01B 69/00* | (2006.01) |
| *B62D 5/09* | (2006.01) |
| *B62D 1/22* | (2006.01) |
| *B62D 11/00* | (2006.01) |
| *B62D 11/04* | (2006.01) |

(Continued)

(52) U.S. Cl.
CPC ............... *B62D 5/09* (2013.01); *B62D 1/22* (2013.01); *B62D 5/08* (2013.01); *B62D 5/12* (2013.01); *B62D 11/005* (2013.01); *B62D 11/04* (2013.01); *B62D 11/24* (2013.01)

(58) Field of Classification Search
CPC .. B62D 11/04; B62D 5/08; B62D 5/09; F15B 9/08
USPC .................................................. 180/414, 442
See application file for complete search history.

(56) References Cited

U.S. PATENT DOCUMENTS

| | | | |
|---|---|---|---|
| 6,354,393 B1 * | 3/2002 | Ahlert | ...................... B62D 5/06 180/403 |
| 6,655,492 B2 | 12/2003 | Juul et al. | |

(Continued)

*Primary Examiner* — Tony H Winner
(74) *Attorney, Agent, or Firm* — Klintworth & Rozenblat IP LLP

(57) ABSTRACT

A steering system is described for a vehicle having steerable wheels. A hydraulic charge pressure circuit may be configured to provide charge pressure to one or more hydraulic components of the vehicle and a hydraulic drive pressure circuit may be configured to provide working pressure to one or more other hydraulic components of the vehicle. Hydraulic machines may rotate front wheels in order to drive the vehicle, and a front valve assembly may control steering of the front wheels by controlling the hydraulic machines. The hydraulic machines may be driven to rotate the front wheels by the working pressure from the hydraulic drive pressure circuit, and the front valve assembly may control the front hydraulic machines to steer the agricultural vehicle by controlling flow of hydraulic fluid from the hydraulic charge pressure circuit through the front valve assembly.

12 Claims, 10 Drawing Sheets

(51) Int. Cl.
*B62D 11/24* (2006.01)
*B62D 5/08* (2006.01)
*B62D 5/12* (2006.01)

(56) References Cited

U.S. PATENT DOCUMENTS

| | | |
|---|---|---|
| 7,837,001 B2 | 11/2010 | Young |
| 8,496,256 B2 | 7/2013 | Bebernes et al. |
| 9,930,824 B2 | 4/2018 | Nafziger et al. |
| 2008/0087014 A1 | 4/2008 | Schick et al. |
| 2008/0091319 A1 | 4/2008 | Schick et al. |
| 2008/0296084 A1 | 12/2008 | Bohm et al. |
| 2009/0152828 A1 | 6/2009 | Bebernes et al. |
| 2012/0109459 A1 | 5/2012 | Bichler |
| 2013/0087209 A1 | 4/2013 | Krahn |

\* cited by examiner

CHARGE PRESSURE CIRCUIT ARRANGEMENT FOR STEERING CONTROL FOR A VEHICLE

CROSS-REFERENCE TO RELATED APPLICATION(S)

This application is a Continuation of U.S. application Ser. No. 14/455,734 filed Aug. 8, 2014.

STATEMENT OF FEDERALLY SPONSORED RESEARCH OR DEVELOPMENT

Not applicable.

FIELD OF THE DISCLOSURE

This disclosure relates to the steering of vehicles, including vehicles with caster-mounted rear wheels.

BACKGROUND OF THE DISCLOSURE

In various settings, relatively precise steering of vehicles may be important. For example, in agricultural settings it may be important to precisely steer an agricultural work vehicle across a field in order to seed, tend, harvest, or otherwise process crops or other material.

In certain vehicles, the configuration of one set of wheels may vary from the configuration of another set of wheels. For example, in various combines, windrowers, or other vehicles, a rear set of wheels may be mounted on casters, whereas a forward set of wheels may be mounted to a fixed axle (or axles). In certain embodiments, the forward wheels may be fixed in a forward-facing orientation (i.e., may not be configured to turn to the sides to steer the vehicle). In such a configuration, the vehicle may be steered at the front wheels by driving the front wheels at different speeds from each other. For example, a dedicated hydraulic machine (e.g., a dedicated hydraulic pump) may be provided for each of the front wheels, such that each wheel may be driven independently of the other.

It may be useful to provide a system to control the steering of both the front and the rear wheels of these types of vehicles, as well as the wheels of vehicles having various other configurations. Known steering control methods may include, for example, the use of a rack and pinion arrangement that is mechanically connected to a steering input device (e.g., a steering wheel), an Ackermann linkage, or another mechanical device. As the steering input device is moved by an operator, this may mechanically rotate the pinion with respect to the rack, thereby mechanically driving movement of the rack (or otherwise move the relevant mechanical device). The movement of the rack (or other device) may in turn, for example, control steering of a set of front wheels or a set of rear wheels. With regard to the rear wheels, for example, the mechanical movement of the rack and pinion may mechanically port flow of hydraulic fluid to hydraulic cylinders at the rear of the vehicle, in order to control steering of a set of rear wheels.

SUMMARY OF THE DISCLOSURE

A steering system is disclosed in which a charge pressure circuit of a vehicle is utilized to control steering of various wheels.

According to one aspect of the disclosure, a steering system is provide for a vehicle having steerable front and rear wheels. A hydraulic charge pressure circuit may be configured to provide charge pressure to one or more hydraulic components of the vehicle, and a hydraulic drive pressure circuit may be configured to provide working pressure to one or more other hydraulic components of the vehicle. Hydraulic machines may rotate the front wheels in order to drive the vehicle, and a front valve assembly may control steering of the front wheels by controlling the hydraulic machines. The hydraulic machines may be driven to rotate the front wheels by the working pressure from the hydraulic drive pressure circuit, and the front valve assembly may control the front hydraulic machines to steer the agricultural vehicle by controlling flow of hydraulic fluid from the hydraulic charge pressure circuit through the front valve assembly.

In certain embodiments, a rear steering device may be configured to steer the rear wheels, with a rear valve assembly configured to control steering of the rear wheels by controlling the rear steering device. A hydraulic steering pressure circuit may provide steering pressure to the rear steering device via the rear valve assembly, in order to operate the rear steering device. The rear valve assembly may control the rear steering device by controlling flow of hydraulic fluid from the hydraulic steering pressure circuit through the rear valve assembly.

The front valve assembly may not be in hydraulic communication with the hydraulic drive pressure circuit. The hydraulic steering pressure circuit may not be in hydraulic communication with the hydraulic drive pressure circuit or the hydraulic charge pressure circuit.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
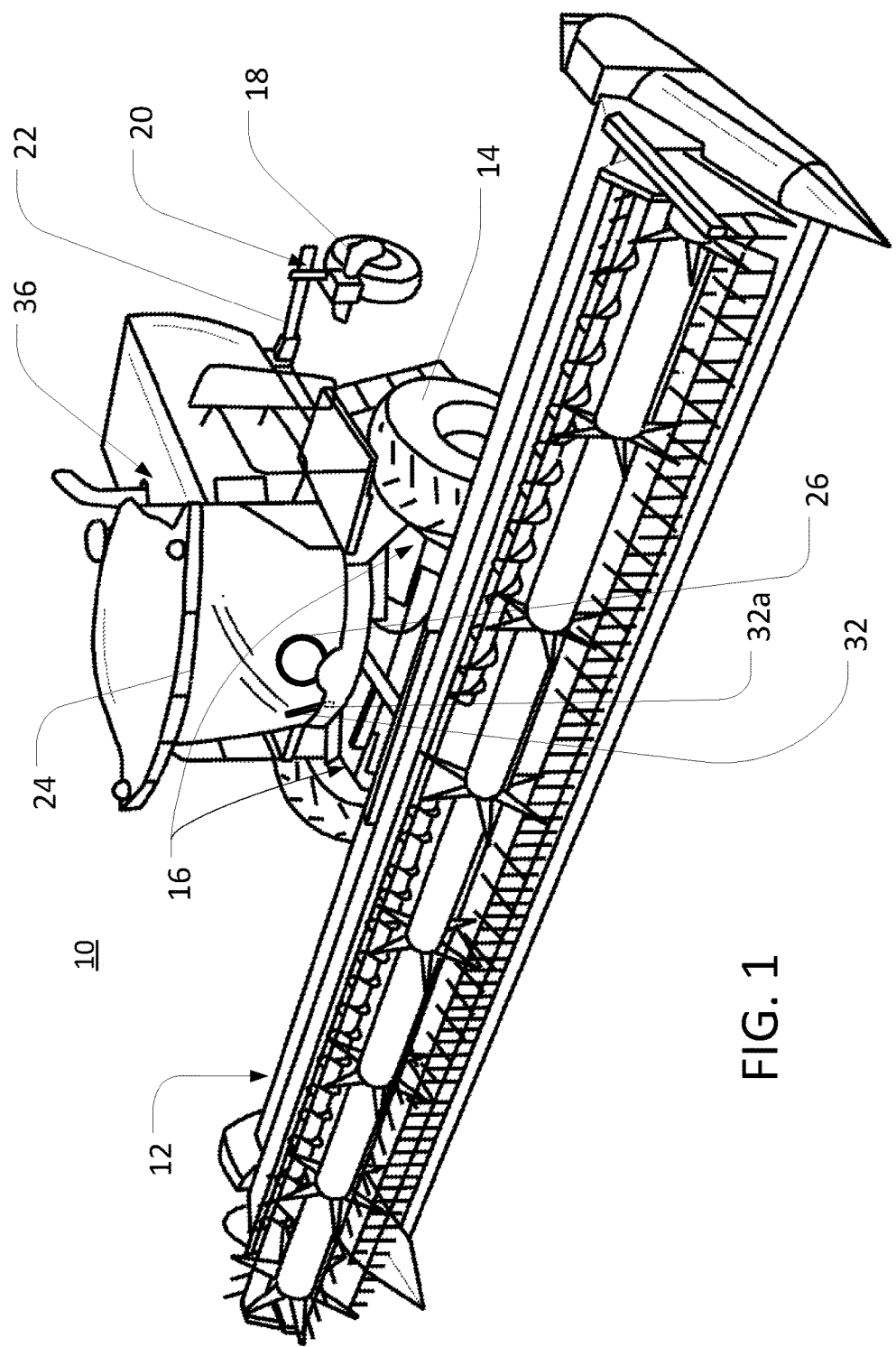
FIG. 1 is a simplified view of an example agricultural vehicle with rear casters.

The following describes one or more example embodiments of the disclosed steering systems (and methods), as shown in the accompanying figures of the drawings described briefly above. Various modifications to the example embodiments may be contemplated by one of skill in the art.

As also noted above, known steering control systems may employ a mechanical link as a main connector between a steering input device (e.g., a steering wheel) and a control system for the steering various wheels of a vehicle. For example, a rack and pinion assembly or Ackermann linkage may be utilized to tie a steering wheel to the wheels of a vehicle, or to a steering device connected to the wheels. Use of such a mechanical link, however, may impede various strategies for automating (including partially automating) steering control. For example, in known combines, a mechanical link (e.g., a rack and pinion arrangement or Ackermann linkage) may be utilized to connect a steering input device (e.g., a steering wheel) to a steering control device (e.g., a control valve for a hydraulic pump or motor), such that any manual steering input received at the steering input device is conveyed by the mechanical link to the steering control device. Accordingly, in order to steer the vehicle, an operator may provide a manual steering input at the steering input device, thereby causing the mechanical link to mechanically control the steering control device.

With such a configuration, however, in order to transition from manual steering to automated (or partially automated) steering, various systems or devices must be provided to circumvent (or ignore or otherwise disable) any mechanical control being provided by the mechanical link. This may complicate (or otherwise impede) the automation of front and rear steering for a vehicle. In certain instances, for example, a motor may be provided that translates automated steering commands into mechanical movement of the steering input device, thereby, in essence, replacing the manual steering input at the steering input device with an automated mechanical steering input at the steering input device. This may introduce significant complexity to the steering system, and the automated movement of a steering input device may be problematic for certain operators.

To address these issues and others, it may be useful to provide a steering system (and method) in which front and rear steering operations are controlled, at least in part, with hydraulic valve assemblies and various hydraulic circuits. Further, it may be useful to provide a steering system in which the mechanical link between the steering input device and a steering control device for the front or rear wheels of the vehicle has been eliminated. In this way, a more efficient and effective transition between automatic and non-automatic steering may be obtained.

In certain embodiments, a steering input device may be configured to operate a hydraulic steering valve (e.g., a manual valve) based upon manual steering input received at a steering input device. Hydraulic flow through the steering valve, as controlled by the manual steering input, may then be utilized to control steering of the vehicle by controlling various hydraulically operated steering devices (e.g., various double-acting pistons) for one or more of the vehicle wheels (e.g., two front wheels and two rear wheels). Various hydraulic control circuits may also be provided, which may be configured to provide automatic steering control signals to various of the steering devices. Because a non-mechanical (e.g., hydraulic) connection may be utilized to communicate the manual steering input from the steering input device to the various steering control devices, it may be possible to relatively easily transition from manual steering to automatic steering by selectively utilizing the hydraulic control circuits, rather than the steering input device, to control the various hydraulic steering devices.

In certain embodiments, two front wheels of a vehicle may be configured to be independently rotated, respectively, by separate hydraulic motors (e.g., swash-plate piston motors). The motors, in turn, may be driven to rotate, respectively, by separate hydraulic pumps. In order to control the speed of the hydraulic pumps, a manually-operated steering valve may be configured to regulate hydraulic flow to either end of a double-acting piston (and cylinder). Opposite ends of the piston may be in mechanical (or other) communication with the hydraulic pumps, such that the position of the piston controls the relative speeds of each of the pumps. In this way, a particular manual steering input may result in a particular flow through the manual steering valve. This flow may dispose the double-acting piston at a particular orientation and the piston may thereby cause the hydraulic pumps (and, accordingly, the hydraulic motors and the front wheels) to operate at particular speeds. Notably, because the hydraulic motors for the front wheels may be driven separately by the separate hydraulic pumps, it may be possible to drive the front wheels at different speeds (e.g., as based upon manual steering input) and thereby steer the vehicle.

It may be also be possible to steer the front wheels automatically, rather than based upon manual steering input. For example, an electronically (or otherwise) controlled front hydraulic valve assembly may also be placed in communication with the double-acting piston for steering the front wheels. Control signals (i.e., particular hydraulic flows and pressures) from this valve assembly may then be utilized, in place of manual steering input, to automatically steer the front wheels. Notably, in such a configuration, a vehicle may be transitioned from manual steering to automated steering, by transitioning control of the double-acting piston from the manually-operated steering valve (as discussed above) to the automatically-operated front valve assembly. For example, the steering valve for manual steering input may be configured such that when the steering input device is returned to a neutral position (e.g., when a steering wheel re-centered) no hydraulic flow is routed through the steering valve to the double-acting piston (e.g., the steering valve may be a closed-center valve). Accordingly, during automated steering, the steering input device may be returned to neutral, such that hydraulic steering signals may be received at the steering device from the front valve assembly, but not the manually-operated steering valve. Accordingly, the front steering may be automatically controlled by the front valve assembly (and associated electronic controllers), rather than manually controlled by the steering input device.

In certain embodiments, in order to control the steering of the rear (or other) wheels, a sensor may be placed in communication with the steering input device. The sensor may be configured to sense manual steering input at the steering input device and to transmit a corresponding steering input signal (e.g., directly, or indirectly, via a controller) to an electronically (or otherwise) controlled rear hydraulic valve assembly. In this way, the rear valve assembly may facilitate the steering of the rear wheels based upon the manual steering input sensed by the steering sensor, without the need for a direct mechanical link between the steering input device and the rear valve assembly (and any associated steering device). For example, a steering sensor may be configured to detect a rate of steering or a degree of steering at a steering wheel (or other steering input device) and transmit a corresponding signal to a controller. The controller may then provide a steering command to the rear valve assembly, based upon the steering signal from the sensor. Based upon the steering commands, the rear valve assembly may then control a hydraulically operated rear steering device (e.g., one or more additional double-acting pistons) in order to automatically steer the rear wheels.

In certain embodiments, one or more rear wheels of a vehicle may be in mechanical communication with one or more double-acting pistons (or other steering control devices), such that actuation of the pistons controls steering of the rear wheels. In order to steer such a vehicle, an operator may turn a steering wheel by a particular amount (e.g., a particular number of degrees) or at a particular rate (e.g., a particular number of degrees per second), or otherwise provide a manual steering input. A sensor in communication with the steering wheel may sense this steering input and transmit a corresponding electrical (or other) steering signal to a controller. The controller may interpret or otherwise process the steering signal in order to provide an appropriate command signal to various valves within a rear valve assembly. Accordingly, the hydraulic flow through these valves (and through the rear valve assembly as a whole) may be regulated based upon the sensed manual steering input. In turn, the flow through the rear valve assembly may control the actuation of the double-acting piston (or another steering device) at each of the rear wheels of the vehicles. In this way, the rear wheels may be automatically steered in accordance with the manual steering input at the steering wheel, without requiring a direct mechanical link between the steering input device and the rear steering devices.

In certain embodiments, the front wheels may alternatively (or additionally) be steered automatically, with the speed of rotation of the front wheels (or other parameters) being controlled independently of any manual steering input at the relevant steering input device. For example, a front valve assembly (e.g., as also described above) may be configured to automatically activate a steering device for the front wheels, based upon a target path for the vehicle rather than a manual steering input at the steering input device. For example, a target path (e.g., a straight line extending across a field) may be determined independently of manual steering input (e.g., based upon a predetermined harvesting plan for a field). The front valve assembly may be configured to automatically move a double-acting piston to control the speed of left- and right-side drive pumps, based upon a target path of travel for the vehicle. Accordingly, the vehicle may be automatically steered at the front wheels based upon a target path of travel.

In certain embodiments, a Global Positioning System ("GPS") device may be utilized to compare a vehicle's current position (or projected path of travel) with a target path of travel across a field (or other terrain). Appropriate automatic steering commands (i.e., electrical control signals) for the front valve assembly may be determined with respect to the vehicle's current position and the target path of travel (e.g., may be determined by a controller, based upon calibrated parameters, a look-up table, or other factors). Based upon receiving these steering commands, the front valve assembly may automatically control steering of the front wheels of the vehicle in order to cause the vehicle to follow the target path. For example, in order to keep a vehicle moving along a target path of travel (e.g., as determined using a GPS device), a controller may automatically regulate hydraulic flow through various valves within the front valve assembly in order to actuate a double-acting piston for the steering of the front wheels.

The rear wheels may also sometimes be steered based upon a target path of travel for the vehicle. For example, when the front wheels are being automatically steered based upon GPS information (as described above), the rear wheels may also be automatically steered to improve the vehicle's tracking of the target path of travel. In certain embodiments, such automated rear steering may also be effected with double-acting pistons in communication with the various rear wheels (as also described above).

Among other benefits, the steering system (and method) described herein may allow for operation of a vehicle in multiple steering modes, including a manual steering mode (or "manual mode"), a manual mode with rear steering assist (i.e., a "rear steering assist mode"), and an automated steering mode (or "automated mode"). In the manual mode, the steering of the forward wheels may be controlled by an operator via manual input to a steering input device such as a steering wheel. As noted above, for example, a manual steering input at a steering input device may operate a manual valve to selectively port hydraulic fluid to either side of a double-side piston (or otherwise actuate a different steering device) and thereby cause the front wheels to be rotated at different speeds.

In the rear steering assist mode, the steering of the rear wheels may be controlled automatically based upon the manual steering of the front wheels, such that the rear wheels may supplement the manual steering control of the front wheels. (As such, it will be understood that a vehicle may operate simultaneously in the manual steering and rear steering assist modes.) In certain implementations, steering of the front wheels may be directly controlled based upon manual steering input at a steering input device, and steering of the rear wheels may be controlled by automated steering commands that are determined based upon the manual steering input. For example, a steering sensor may detect a rate (or degree) of steering at a steering input device and provide corresponding steering signals to a controller. Based upon these steering signals, the controller may then regulate flow through a rear valve assembly to control the rear steering based upon signals from the steering sensor. The rear wheels may be automatically steered to turn the rear of the vehicle in an opposite direction from the manually-steered front of the vehicle, in order to decrease the effective turning radius of the vehicle for a given operation, or may be otherwise automatically steered to appropriately align the vehicles with the desired path of travel indicated by the manual steering input.

In the automated mode, steering of the forward wheels and the rear wheels may be controlled automatically, without manual steering input from an operator. For example, in order to direct a vehicle along a target path of travel, a controller may automatically regulate hydraulic flow through a front valve assembly to automatically control steering of the front wheels, and the same (or a different) controller may automatically regulate hydraulic flow through a rear valve assembly to automatically control steering of the rear wheels. In the automated steering mode, a target path of travel may be utilized to determine various steering commands. For example, GPS information may be utilized to identify whether a vehicle is deviating (or is expected to deviate) from a target path of travel, and steering commands (e.g., various control signals for relevant valve assemblies) determined accordingly.

A steering system (and method), as described herein, may also facilitate relatively easy customization of steering control by operators of a vehicle. For example, where front and rear valve assemblies are configured to control, respectively, front and rear steering of a vehicle, an operator may adjust the gain (or other parameters) for various controlled valves within either valve assembly in order to adjust the sensitivity (or aggressiveness, and so on) of the steering control for either set of wheels. For example, an operator may adjust the gain of various proportional control valves within a rear valve assembly in order to adjust the aggressiveness of the rear steering, during rear steering assist mode, for a given manual steering input.

Notably, adjustments to steering control sensitivity may not be possible (at least to the same degree) for systems with a direct mechanical control link between the steering input device and the various steering control devices. Further, in various of the embodiments described herein, certain adjustments to the front and rear valve assemblies by an operator may be utilized for the manual or rear steering assist modes but may be disregarded during operation of the vehicle in the automated steering mode. In this way, an operator may implement customized steering control for the rear steering assist and manual modes, without disturbing a predetermined configuration of the steering system for the automated mode. For example, the gain for various proportional control valves in a particular valve assembly may be adjusted by an operator for rear steering assist mode in order to decrease (or increase) the amount of steering at the rear wheels for a given manual steering input. When the vehicle is transitioned from the rear steering assist mode to the automated steering mode, the valve gains may then be automatically reset to a default (or other) setting to ensure appropriate automated control. Likewise, the gain for various proportional control valves in a particular valve assembly may be automatically changed to a customized setting (e.g., to settings previously chosen by an operator) when the vehicle is transitioned from the automated steering mode to the rear steering assist mode.

The disclosed steering system (and method) may also facilitate, among other things, faster and easier transitions between various steering modes. In certain embodiments, where no direct mechanical link is provided between the rear valve assembly and the steering input device, it may be possible to switch relatively quickly from the manual mode to the rear-steering assist mode or to the automated mode. For example, with a vehicle operating in manual steering mode, the rear steering assist mode may be engaged (or disengaged) by utilizing (or ignoring) a steering input signal from a steering sensor, rather than by necessarily disconnecting (or otherwise disregarding) a mechanical connection. Likewise, a vehicle may be transitioned from the manual steering mode (and the rear steering assist mode) into the automated steering mode by switching from control of front and rear steering device based upon manual steering input (and related signals from the steering sensor) to control of the front and rear valve assemblies based upon a target vehicle path. Where there is no relevant mechanical link to sever (or disregard) this switch may be effected quickly and automatically by, for example, simply changing the control strategy implemented by a controller at the front and rear valve assemblies.

Notably, due to the improved sensitivity and control of the disclosed steering system (and method), it may be possible to safely and effectively operate a particular vehicle that is utilized such a system (or method) at significantly elevated speeds. For example, the enhanced control provided through active control of rear steering, whether in the automated mode or the rear steering assist mode, may allow a vehicle to safely and effectively travel at relatively high speeds without significant deviation from a target path of travel.

It will be understood that eliminating a direct mechanical link between a steering input device and a steering control device, steering control valve assembly, or other device or system may not require the complete absence of mechanical components from the relevant systems or assemblies. For example, various hydraulic control valves may include mechanical components such as pistons, gates, tubing, and so on, and various other at least partially mechanical devices (e.g., double-acting pistons) may also usefully be included in steering control. In this light, this disclosure contemplates eliminating mechanical links between steering input devices and other components of a steering control system (e.g., rear steering devices) in the sense of configuring these (and related) devices and components to exchange control information via electronic, hydraulic, or other primarily non-mechanical means rather than through primarily mechanical means such as gears, racks, mechanical linkages, and so on. In this light, a rack-and-pinion assembly (or similar mechanical mechanism) for transmitting steering information from a steering wheel to an electrohydraulic valve assembly or hydraulic steering device may be viewed as providing a mechanical link between the steering wheel and the valve assembly. In contrast, a signal line between a sensor on a steering column and a controller or valve assembly may not provide a mechanical link between the steering column and the controller or valve assembly, even if the signal line, controller or valve assembly includes mechanical elements such as check-valves, mechanical relays, and so on.

Referring now to FIG. 1, an example agricultural vehicle 10 is depicted. It will be understood that the configuration of the vehicle 10 presented in FIG. 1 is intended only as an example and that other configurations in keeping with this disclosure may be possible. As depicted in FIG. 1, the vehicle 10 may be an agricultural windrower, with a header 12 for cutting and gathering crop material (e.g., a draper platform). Front wheels 14 may be fixed in a forward-facing orientation (i.e., may not pivot with respect to the vehicle 10), and may be independently driven by respective hydrostatic machines to steer the front of the vehicle 10. For example, a hydraulic drive circuit 16 for each of the front wheels 14, respectively, may include two different hydraulic (or other) machines such as a hydraulic pump (not shown in FIG. 1) driven by an engine 36 of the vehicle 10, and a hydraulic motor (not shown in FIG. 1) driven by the hydraulic pump. The motor-pump pairings of the respective drive circuits 16 may accordingly be used, respectively, to drive the left-side and right-side wheels 14 at independent (and, potentially, different) rotational speeds. In this way, although the front wheels 14 may not pivot with respect to the vehicle 10, the front wheels 14 may be steered (and may steer the vehicle 10) based upon the difference in speed between the left-side front wheel 14 and the right-side front wheel 14 (e.g., as controlled by the left-side and right-side hydraulic drive circuits 16, respectively). As discussed in greater detail below, a front steering device of various configurations (not shown in FIG. 1) may be utilized to control the relative speeds of the hydraulic motors, and thereby control steering of the front wheels 14.

Rear wheels 18 may also be steerable wheels, although the rear wheels 18 may be configured differently from the front wheels 14. For example, the rear wheels 18 may be mounted, respectively, on casters 20, which may allow the wheels 18 to rotate independently of each other and of a fixed rear-wheel support 22. It will be understood that various other configurations of the rear wheels 18 may be possible, and that the control architectures contemplated by this disclosure may also be employed with non-caster rear wheels, or other configurations.

In the configuration depicted, if the rear wheels 18 and the casters 20 are allowed to rotate freely, they may generally track turns of the vehicle 10 as it is otherwise steered (e.g., as the motors provide different speeds to each of the front wheels 14), but without the rear wheels 18 providing any active steering for the vehicle 10. For example, as the front wheels 14 turn the vehicle 10 to the left in the manual steering mode, the turning (and continued forward motion) of the vehicle 10 may cause the rear casters 20 to pivot to the left and thereby to turn the rear wheels 18 to track the turn of the vehicle 10. In certain instances, however, if the rear wheels 18 are not actively steered, the rear wheels 18 may tend to become misaligned with the path of travel of the vehicle 10. For example, due to ground impacts or other events, the wheels 18 may sometimes rotate on the casters 20 such that the wheels 18 drag on the ground, rather than rolling, or such that the wheels 18 tend to steer the rear of the vehicle 10 away from the intended path of travel of the vehicle 10.

The vehicle 10 may also include a cab 24 from which an operator may control the operation of the vehicle 10. A steering input device, such as a steering wheel 26, may be included in the cab 24, such that an operator may direct the steering of the vehicle 10 (in certain steering modes) by providing manual steering input. It will be understood that other steering input devices (e.g., levers, joysticks, touch-screen devices, and so on) may additionally (or alternatively) be utilized. Various other input devices may be also provided within the cab. For example, a hydraulic-system control device (e.g., a hydraulic control lever 32) may be provided for transitioning the vehicle between various operating modes (e.g., between an active operating mode in which various hydraulic systems are operating, a parked mode in which the vehicle is in an energized state but various hydraulic systems may not be operating, and so on).

Figure 2:
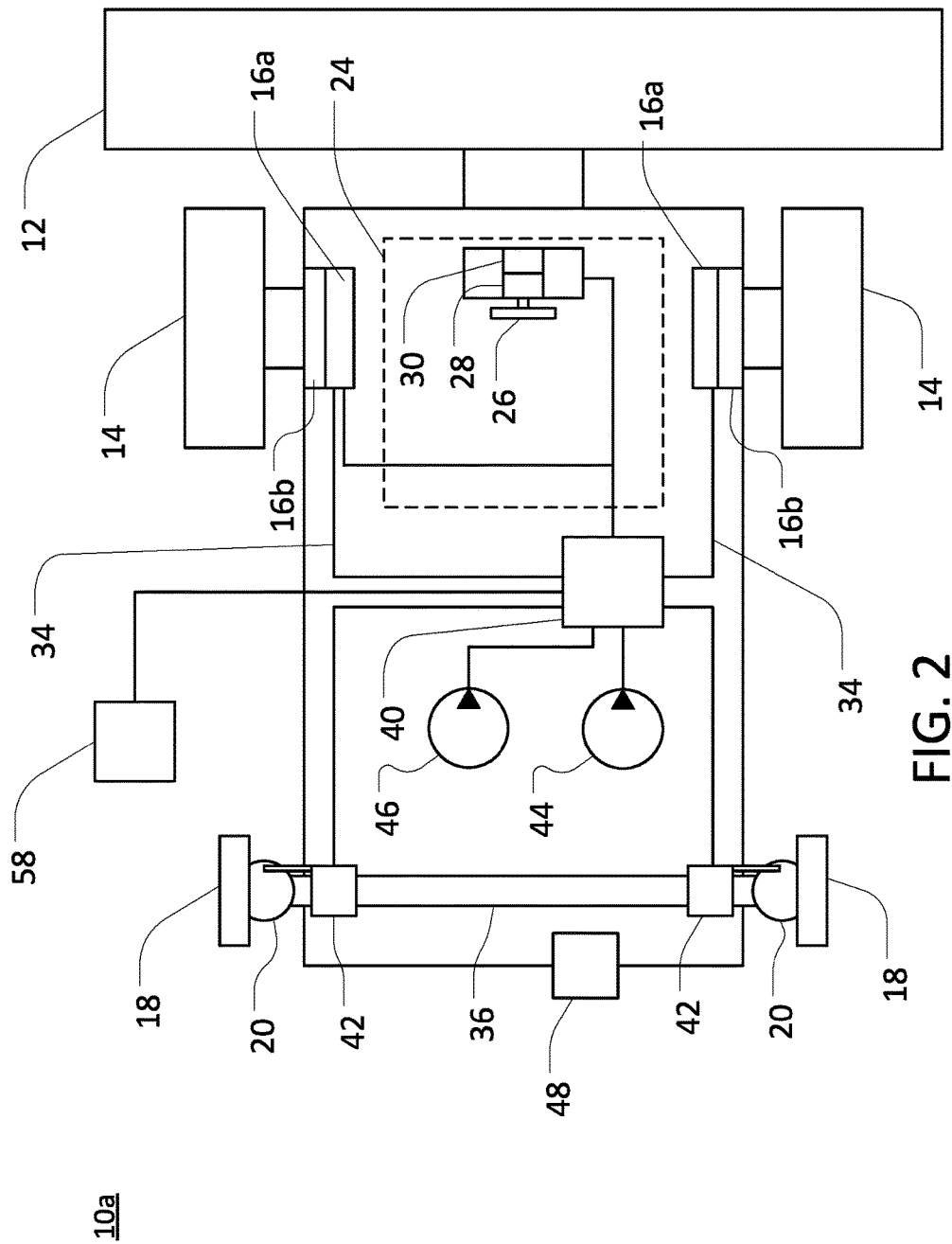
FIG. 2 is a schematic view of an example steering system for a vehicle with rear casters.

Referring also to FIG. 2, an example configuration of the vehicle 10 is represented as an example vehicle 10a. In order to control steering of the front or rear wheels 14 or 18 of the vehicle 10a, a valve assembly 40 may be integrated into a larger control circuit (as depicted in the various figures) such that the valve assembly 40 is in communication with various other components of the vehicle 10. The valve assembly 40 may be in hydraulic communication with various components, such as rear steering devices 42, and may be in electronic communication with various components, such as an electronic controller 58 (or other control unit). The valve assembly 40 may also be in communication (e.g., via a mechanical connection) with components of the front hydraulic drive circuit 16, such as hydraulic front drive pumps 16a (or related control devices such as control valves for the pumps 16a, and so on). In this way, for example, the valve assembly 40 may be utilized to control the speed of the drive pumps 16a (e.g., by mechanically adjusting the pumps 16a) in order to control, respectively, the speed of hydraulic front drive motors 16b. Accordingly, because the front drive motors 16b may be driven independently, with respect to each other, the valve assembly 40 may be utilized to control steering of the front wheels 14. The valve assembly 40 may also be utilized to control the rear steering devices 42 (e.g., by hydraulically actuating the devices 42) in order to control the steering of the rear wheels 18.

Figure 5:
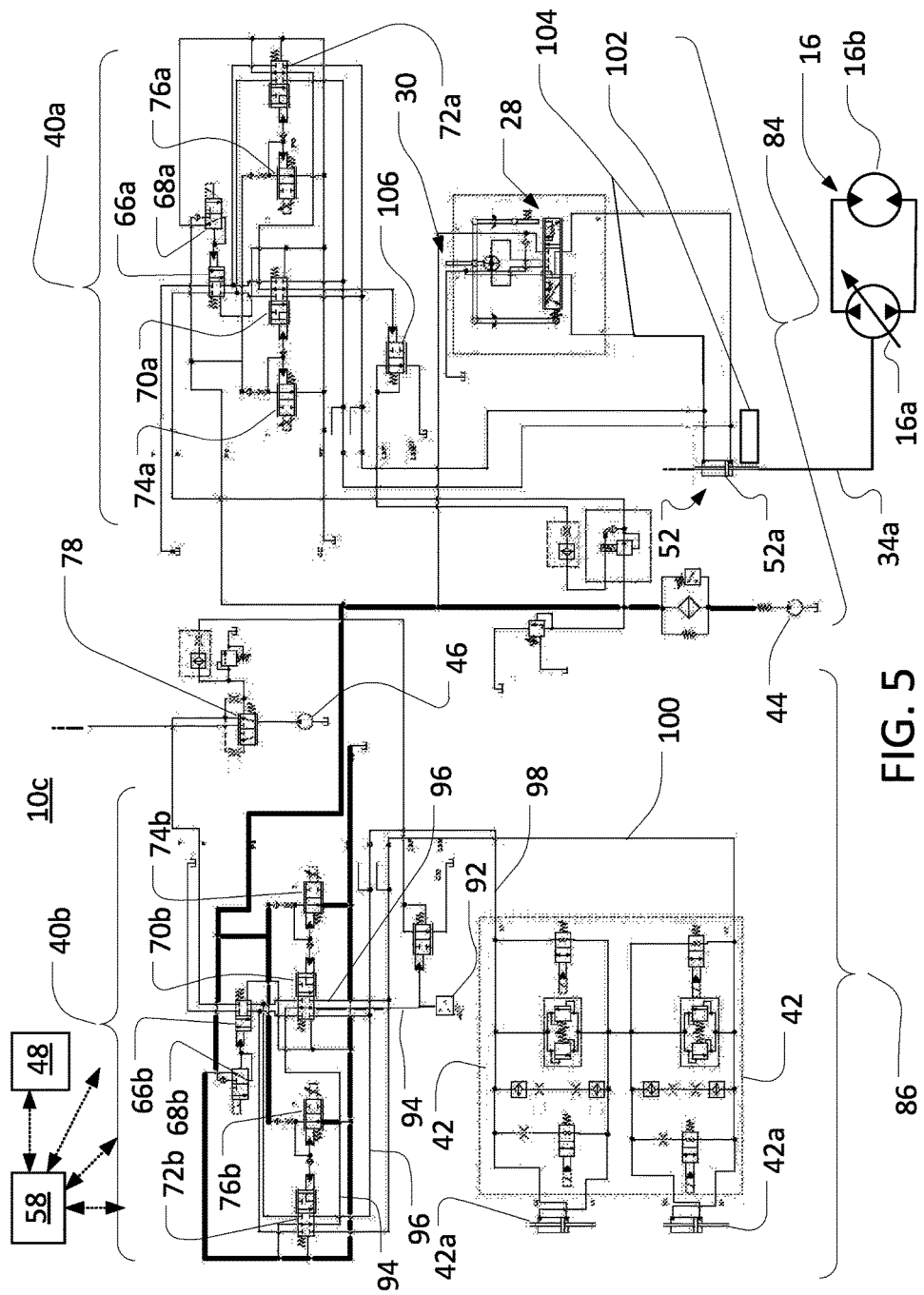
FIG. 5 is a schematic view of an example hydraulic system included in the example steering system of FIG. 4.

In certain embodiments, the valve assembly 40 may include one or more hydraulic circuits, including various hydraulic valves (e.g., electronically controlled valves) and various hydraulic and electrical lines (see, e.g., FIG. 5). The valve assembly 40 may receive charge pressure and operating pressure from various pumps (e.g., pumps 44 and 46) and may discharge pressure to one or more tanks (not shown in FIG. 2). In certain embodiments, as discussed in greater detail below, the pump 44 may be configured as a lower pressure charge pump, and the pump 46 may be configured as a higher pressure steering pump.

Control signals (e.g., hydraulic or electronic signals) may be received at the valve assembly 40 from a variety of sources, including those specifically discussed herein and various others. In certain embodiments, the controller 58 may be in electrical (or other) communication with various valves (or other components) of the valve assembly 40 in order to control the operation of those valves (or other components). For example, various valves included in the valve assembly 40 may be configured to operate based upon electronic steering commands (e.g., various electronic signals) from the controller 58 (or another device). The controller 58 may also be in electrical (or other) communication with a steering sensor 30 (connection to the controller 58 not shown), various control circuits, various other electrohydraulic valve assemblies (as shown, for example, in FIGS. 3 and 4), and so on. The controller 58 may be configured as a computing device with one or more processors and memory architectures, as a hard-wired computing circuit (or circuits), as a hydraulic or electrohydraulic control device, and so on.

It will be understood that the various control (and other) lines depicted in the various figures may be viewed as representing, in various configurations, either one flow line (or other signal line) or multiple such lines. As such, unless specifically noted for a particular example or implementation, it will be understood that the depicted lines may be utilized to carry any variety of signals (e.g., hydraulic and electrical signals), as may be appropriate. As such, for example, a particular control line depicted in the various figures may, in certain implementations, represent two or more control lines (e.g., an electrical signal line and a hydraulic flow line). Further, it will be understood that lines (or other signal-transmission devices) may be routed between, and may connect to, various depicted (and hidden) components and assemblies in a variety of known ways. In certain embodiments, wireless transmission of electrical control signals may be utilized in place of wired connections.

Figure 4:
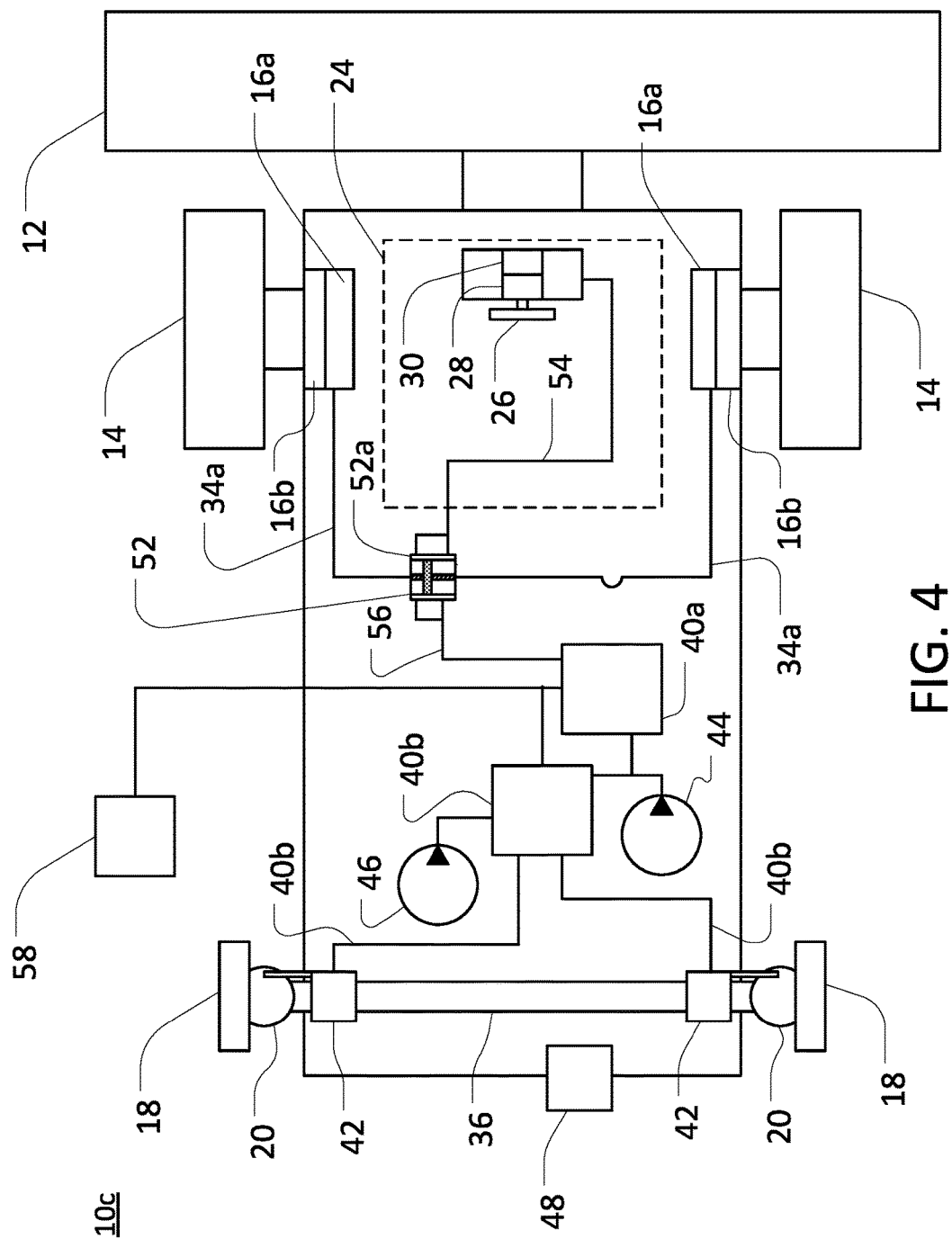
FIG. 4 is a schematic view of yet another example steering system for a vehicle with rear casters.

In order to control the steering of vehicle 10a based upon manual steering input at the steering wheel 26, various hydraulic, electrical, or other components may be configured to provide signals (e.g., hydraulic or electrical signals) to the valve assembly 40 (and various other devices). In certain embodiments, for example, a manual steering valve 28 may be in communication with the steering wheel 26 such that an operator turning the wheel 26 (i.e., providing a manual steering input) causes the valve 28 to provide a corresponding flow of hydraulic fluid to the valve assembly 40 (e.g., to a steering device included in the valve assembly 40). In this way, manual steering input at the steering wheel 26 may be implemented as hydraulic steering signals to steer the wheels of the vehicle 10a. In certain embodiments, the valve 28 may alternatively (or additionally) provide the hydraulic flow to other devices or assemblies (e.g., a steering device not included in the valve assembly 40, as depicted in the embodiment of FIG. 4).

In certain embodiments, the steering sensor 30 (e.g., an electronic or electrohydraulic sensor) may also detect a manual steering input, such as the turning of the wheel 26 (e.g., by detecting a rate of turning of the wheel 26 in a particular direction). The steering sensor 30 may then provide a corresponding steering input signal (e.g., an electronic or hydraulic signal) to the valve assembly 40, the controller 58 (signal line not shown), or various other devices, to facilitate steering control based upon the manual steering input. In certain embodiments, the sensor 30 may be an optical sensor that detects rotation of a steering column associated with steering wheel 26 and provides an electrical signal representing the rotation of the steering column (and, thereby, of the steering wheel 26) to controller 58, or to one or more control valves (or other devices or components) within electrohydraulic valve assembly 40. In certain embodiments, other sensor types may be used, including Hall effect sensors, or others.

As noted above, it may sometimes be useful to control steering of the vehicle 10a by actively steering the rear wheels 18 (e.g., in the rear steering assist mode or the automated steering mode) as well as the front wheels 14. As such, the vehicle 10a may include various rear steering devices, such as the hydraulically (or otherwise) operated rear steering devices 42, which may be utilized to selectively control the orientation of the wheels 18 (or the casters 20). The steering devices 42 may be controlled based upon hydraulic signals from the valve assembly 40, which may in turn be determined based upon various factors (e.g., manual steering input, as discussed above, or a target path of travel, as discussed below). In certain embodiments, the rear steering devices 42 may be included as part of the valve assembly 40, rather than as distinct components of the vehicle 10a.

In certain embodiments, the steering devices 42 may be viewed as being included in a dual-path hydraulic circuit (or system), such that selectively routing hydraulic flow along a particular path of the dual-path circuit may result in the turning of one or both of the rear wheels 18 in a particular direction. For example, each rear steering device 42 may include a double-acting hydraulic piston (not depicted in FIG. 2) that is connected to a pivot arm. The pivot arm, in turn, may be connected to the corresponding caster 20 for the respective rear wheel 18. In this way, through the actuation of the double-acting pistons, the rear wheels 18 may be selectively (and independently) rotated in either direction on the casters 20, in order to (independently) control the steering of the rear wheels 18.

In certain embodiments, a particular pump (e.g., the pump 46) may be provided for operation only of one (or both) of the rear steering devices 42 (and associated valve assemblies). In certain embodiments, the rear steering devices 42 (or various other devices and systems described herein) may share a pump (e.g., the pump 46, the pump 44, or another pump (not shown in FIG. 2)) with one or more other devices or systems. In certain embodiments, the pump 46 may be a high pressure pump (e.g., a high pressure "steering" pump) that may be configured to supply hydraulic fluid for operation of the rear steering device 42 as well as various other devices. In certain embodiments, the pump 44 may be a lower pressure charge pump that may be configured mainly to provide charge pressure to various hydraulic circuits or devices.

It will be understood, as also noted above, that various alternative configurations may be possible. For example, the valve assembly 40 may directly include components such as the hydraulic motors 16b, the pump 44 (or various other pumps, such as the pump 46), the controller 58, and so on, or may communicate with such components via various signal lines external to the valve assembly 40. Similarly, as depicted in subsequent figures, the valve assembly 40 may be replaced with (or separated into) multiple valve assemblies or other devices.

In certain embodiments, the valve assembly 40 (and related hydraulic circuits) may not be disposed in hydraulic communication with the hydraulic drive circuits 16 (other than potentially draining to a shared tank). For example, rather than hydraulic connections between the valve assembly 40 and the drive circuits 16, mechanical connections 34 may be provided between a steering device of the valve assembly 40 and the pumps 16a. As such, the speed of the pumps 16a may be mechanically controlled, based upon hydraulic steering signals from the valve assembly 40, hydraulic steering signals from the manual steering valve 28, or other control signals. In contrast, no analogous mechanical link may be provided between the valve assembly 40 and the rear steering devices 42.

When the vehicle 10a is operating in the manual steering mode, but not in the rear steering assist mode, the front wheels 14 may be steered based on the hydraulic flow through the manual steering valve 28. For example, manual steering input at the steering wheel 26 may regulate hydraulic flow through the manual steering valve 28. This hydraulic flow, in turn, as routed through via various intermediary devices, may cause the two pumps 16a to drive the two front wheels 14 at different speeds. For example, a steering device (not shown in FIG. 2) included in the valve assembly 40 may mechanically (or otherwise) adjust the speed of the pumps 16a based upon hydraulic signals from the manual steering valve 28, in order to drive the front wheels 14, respectively, at appropriate speeds. In the manual steering mode, however, the valve assembly 40 may not actively control steering of the rear wheels 18 via the rear steering devices 42. For example, no hydraulic flow may be provided from the valve assembly 40 to the rear steering devices 42, and the rear casters 20 may accordingly rotate relatively freely with respect to the rear support 22.

In the rear steering assist mode, the front wheels may still be steered based on the hydraulic flow through the manual steering valve 28, as discussed above. The rear wheels 18, however, may be actively (and automatically) steered based upon manual steering input at the steering wheel 26. For example, the steering sensor 30 may detect a steering rate (or degree of steering) for a manual steering input received at the steering wheel 26, and may provide a corresponding electronic signal to the controller 58. The controller 58 may then provide a corresponding steering command to the valve assembly 40, and thereby actuate the rear steering devices 42 in order to hydraulically control the steering of the rear wheels 18. As noted above, the rear steering assist mode may be implemented simultaneously with the manual steering mode.

In the automated steering mode, the rear wheels 18 may continue to be steered by the rear steering devices 42 based upon steering commands provided from the controller 58 to the valve assembly 40. In the automated steering mode, however, such steering commands may not be based upon any manual steering input at the steering wheel 26. Rather, the rear steering commands for the automated steering mode may be automatically determined based upon a target path of travel for the vehicle 10a. Similarly, in the automated steering mode, the front wheels 14 may also be steered based upon steering commands provided from the controller 58 to the valve assembly 40, rather than manual steering input at the steering wheel 26. For example, a steering device (not shown in FIG. 2) included in the valve assembly 40 may adjust the speed of the pumps 16a based upon steering commands provided from the controller 58 to the valve assembly 40, in order to drive the front wheels 14, respectively, at appropriate speeds. In certain embodiments, detection of manual steering input at the steering wheel 26 (e.g., detection by the steering sensor 30) may cause the vehicle 10a to exit the automated steering mode.

In certain embodiments, steering commands for the automated steering mode (or other modes) may be determined based upon a target path of travel for the vehicle 10a. For example, a target path for the vehicle 10a (e.g., an "A to B" path across a field) may be determined in various known ways. During operation, the current position of the vehicle 10a may then be determined based upon location information from a GPS device 48 (or another location-detection system). Based upon various additional factors, such as the current speed or orientation of the wheels 14 or 18 or the current ground speed of the vehicle 10a (as determined, for example, with various wheel speed sensors (not shown)), appropriate steering operations to maintain the desired path of travel (e.g., the target "A to B" path) may be determined, and corresponding steering commands provided to the valve assembly 40 (or other devices) by the controller 58.

Figure 3:
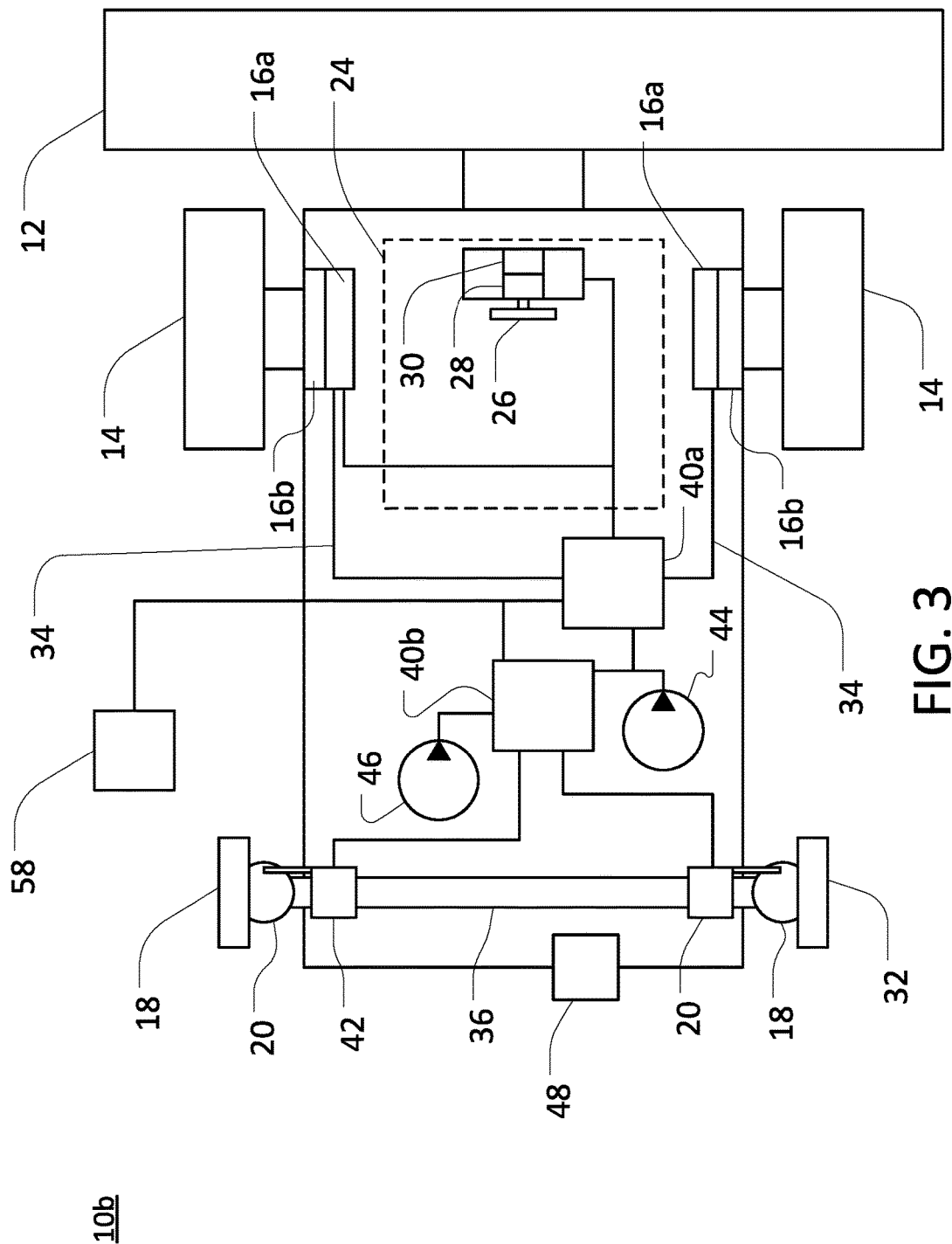
FIG. 3 is a schematic view of another example steering system for a vehicle with rear casters.

Referring also to FIG. 3, in a similar example configuration, designated herein as vehicle 10b, the functionality of the valve assembly 40 (see FIG. 2) may be divided among two or more separate (but potentially interconnected) valve assemblies, such as electrohydraulic valve assemblies 40a and 40b. In such a configuration, various functionality may be controlled by one or both of the separate valve assemblies 40a and 40b. For example, the valve assembly 40b may be configured to generally control automatic steering of the rear wheels 18 (e.g., in the rear steering assist and automated steering modes), while the valve assembly 40a may be configured to generally control automatic steering of the front wheels 14 (e.g., in the automated steering mode). In certain embodiments, a front steering device (not shown in FIG. 3) may also be included in the valve assembly 40a, such that the valve assembly 40a may also contribute to steering of the front wheels 14 in the manual steering mode.

One or both of the valve assemblies 40a and 40b may be configured to receive hydraulic flow from one or both of the pumps 44 and 46. In certain embodiments, the pumps 44 and 46 may nonetheless operate on separate hydraulic circuits (e.g., may not be in fluid communication, even if both pumps 44 and 46 are providing pressurized flow to one or both of the valve assemblies 40a and 40b). For example, the pump 44 may be configured as a charge pump providing pilot pressure to a first portion of the valve assembly 40b (e.g., to enable operation of the valve assembly 40b) as well as various other devices or systems (e.g., for motor speed shifts or park brake release, to provide charge pressure to the drive pumps 16a or power take-off drive pumps (not shown), and so on). In contrast, the pump 46 may be a higher pressure pump providing operating pressure to a second portion of the valve assembly 40b, which may be hydraulically isolated from the first portion.

In the configuration depicted in FIG. 3, hydraulic (or electrical) steering signals may be transmitted from the manual steering valve 28 (or the steering sensor 30) to the valve assembly 40a, or to various other devices (e.g., the controller 58), based upon manual steering input at the steering wheel 26. Various other steering signals (e.g., an electrical signal from the steering sensor 30 representing corresponding manual steering input at the steering wheel 26) may also be transmitted to the controller 58, as well as to various other devices. As with the example configuration depicted in FIG. 2, in the configuration of FIG. 3, the valve assemblies 40a and 40b may also receive (and provide) electrical or hydraulic information from (and to) various other components or systems of the vehicle 10b, including those not specifically depicted in the figures.

As with the configuration of FIG. 2, when the vehicle 10b is operating in the manual steering mode (but not also in the rear steering assist mode), the front wheels 14 may be steered based on the hydraulic flow through the manual steering valve 28, and the steering of the rear wheels 18 may not be actively controlled. For example, manual steering input at the steering wheel 26 may regulate hydraulic flow through the manual steering valve 28. This hydraulic flow, via various intermediary devices, may then cause the two pumps 16a to drive the two front wheels 14 at different speeds. For example, a steering device (not shown in FIG. 3) included in the valve assembly 40a may mechanically (or otherwise) adjust the speed of the pumps 16a based upon hydraulic signals from the manual steering valve 28, in order to drive the front wheels 14, respectively, at appropriate speeds.

In the rear steering assist mode, the front wheels may still be steered based on the hydraulic flow through the manual steering valve 28, and the rear wheels 18 may be automatically steered based upon electrical signals from the steering sensor 30. For example, the steering sensor 30 may detect a steering rate (or degree of steering) for a manual steering input received at the steering wheel 26, and may provide a corresponding electrical signal to the controller 58. The controller 58 may then provide a corresponding steering command to the valve assembly 40b, and thereby actuate the rear steering devices 42, in order to hydraulically control the steering of the rear wheels 18.

In the automated steering mode, the rear wheels 18 may be similarly steered by the rear steering devices 42, based upon steering commands provided from the controller 58 to the valve assembly 40b. In the automated steering mode, however, such steering commands may be based upon a target path of travel (e.g., a predetermined A-to-B path), rather than upon any manual steering input at the steering wheel 26. Indeed, in certain embodiments, detection of manual steering input at the steering wheel 26 (e.g., detection by the steering sensor 30) may cause the vehicle 10b to exit the automated steering mode.

When the vehicle 10b is operating in the automated steering mode, the front wheels 14 may also be steered based upon steering commands provided from the controller 58 to the valve assembly 40a, rather than any manual steering input at the steering wheel 26. For example, a steering device (not shown in FIG. 3) included in the valve assembly 40a may adjust the speed of the pumps 16a based upon steering commands provided from the controller 58 to the valve assembly 40a, in order to drive the front wheels 14, respectively, at appropriate speeds.

The controller 58 may control the valve assemblies 40a and 40b (or other devices or assemblies) in various ways. With regard to the valve assembly 40a, for example, a steering command from the controller 58 may be a current signal of appropriate intensity, which may be provided to a proportional valve (or valves) within the assembly 40a (see, e.g., FIG. 5). This may result in a particular flow of hydraulic fluid from the valve assembly 40a to the relevant steering device, such that the front wheels 14 are driven at appropriate (e.g., different) speeds. Similarly, a steering command from the controller 58 to the valve assembly 40b may be another current signal of appropriate intensity, which may be provided to another proportional valve (or valves) within the assembly 40b (see, e.g., FIG. 5). This may result in a particular flow of hydraulic fluid from the valve assembly 40*b* to the rear steering devices 42, such that the casters 20 (and, thereby, the rear wheels 18) are pivoted by an appropriate amount.

Referring also to FIG. 4, in certain embodiments, another example vehicle 10*c* may include a front hydraulic steering device 52 for control of the steering of the front wheels 14, with the steering device 52 being disposed separately from the valve assembly 40*a*. The steering device 52 may take a variety of forms, may receive electrical or hydraulic input from the steering valve 28, the valve assembly 40*a*, or other devices, and may, in certain embodiments, be included in one or both of valve assemblies 40*a* and 40*b*, rather than being configured as a separate component or device (e.g., as depicted in FIGS. 2 and 3).

As also noted above, one or both of the valve assemblies 40*a* and 40*b* may be configured to receive hydraulic flow from one or both of the pumps 44 and 46. In certain embodiments, the pumps 44 and 46 may nonetheless operate on separate hydraulic circuits (e.g., may not be in fluid communication, even if both pumps 44 and 46 are providing pressurized flow to one or both of the valve assemblies 40*a* and 40*b*). For example, the pump 44 may be configured as a charge pump providing pilot pressure to a first portion of the valve assembly 40*b* (e.g., to enable operation of the valve assembly 40*b*), whereas the pump 46 may be a higher pressure pump providing operating pressure to a second portion of the valve assembly 40*b*, which may be hydraulically isolated from the first portion.

In certain embodiments, including as depicted in FIG. 4, front steering control may be implemented via a dual-path hydraulic system within which the front steering device 52 is included. For example, the steering device 52 may include a double-acting piston 52*a* disposed within a cylinder. Hydraulic fluid may be routed along either of two paths to pressurize, respectively, either side of the piston 52*a* and thereby move the piston 52*a* within the cylinder. Depending on the relative position of the piston 52*a*, the piston 52*a* may control the front drive pumps 16*a* in order to cause the respective drive motors 16*b* to drive the front wheels 14, respectively, at appropriate speeds. For example, through the mechanical connections 34*a*, the particular position of the piston 52*a* within the cylinder may place the respective pumps 16*a* in particular operating states and, accordingly, cause the respective motors 16*b* to rotate at particular speeds.

As depicted, the steering device 52 may be configured to receive hydraulic (or other) signals from the manual steering valve 28, via hydraulic line 54, as well as steering input from valve assembly 40*a*, via hydraulic line 56. Accordingly, in the manual steering mode (with or without rear steering assist), a manual steering input at the steering wheel 26 may cause the manual steering valve 28 to port more hydraulic fluid through one path of the dual-path hydraulic system than the other, thereby pressurizing a particular side of the piston 52*a* and moving the piston 52*a* within the cylinder of the steering device 52. This, in turn, may mechanically (or otherwise) cause the hydraulic motors 16*b* to rotate at particular speeds and thereby steer the front wheels 14 in a particular direction.

In the automated steering mode, the controller 58 may provide steering commands to the valve assembly 40*a* (e.g., based upon a target path of travel, position information from the GPS device 48, and other factors), in order to cause the valve assembly 40*a* to route more hydraulic fluid through one path of the dual-path hydraulic system, thereby pressurizing a particular side of the piston 52*a*. Again, this may move the piston 52*a* within the cylinder of the steering device 42 in order to cause the hydraulic motors 16*b* to rotate at particular speeds and thereby steer the front wheels 14 in a particular direction. In the automated steering mode, no flow may be ported through the manual steering valve 28, such that front steering in controlled by the controller 58 but not by any manual steering input.

Notably, the use of steering systems as described herein (e.g., systems that equip a manual steering input device such as the steering wheel 26 with a manual steering valve and a steering sensor in communication with the hydraulic valve assembly 40, the controller 58, and so on), may allow for control of the steering of the various depicted vehicles 10, 10*a*, 10*b*, and 10*c* without the need for a direct mechanical link (e.g., a rack and pinion device, mechanical linkage, or other mechanical assembly) between the steering input device (e.g., the steering wheel 26) and certain other devices. Accordingly, the vehicle 10 (and others) may be easily transitioned between various steering modes. For example, for rear steering assist mode, manual steering input at the steering wheel 26 may be translated to an electronic signal by the steering sensor 30 rather than relayed directly as a mechanical (or hydraulic) signal to the rear valve assembly 40*b* and the rear steering devices 42. As such, the vehicle 10*c* may be easily transitioned in and out of the rear steering assist mode (or automated steering mode), by utilizing (or not utilizing) the signal from the steering sensor 30.

For convenience, example implementations of the various steering modes will be described below with respect to the configuration of the vehicle 10*c*, as depicted in FIG. 4. It will be understood, however, that similar principles may be applied with regard to the configurations of the vehicle 10*a* in FIG. 2 and the vehicle 10*b* in FIG. 3, as well as various other configurations.

As also noted above, in the manual steering mode for the vehicle 10*c*, the front wheels 14 may be steered based upon manual steering input provided by an operator at the steering wheel 26, which input (or a signal derived therefrom) may be routed to the steering control device 52 in order to control steering of the front wheels 14. In certain embodiments, as also described above, this control may be effected by way of a dual-path hydraulic system including the double-acting piston 52*a*. For example, an operator may turn the steering wheel 26 a certain amount (or with a certain steering rate), or may otherwise provide a manual steering input, in order to indicate a desired steering operation. This turning of the steering wheel 26 may cause the manual steering valve 28 to selectively port hydraulic flow from the pump 44, in order to control the articulation of the steering piston 52*a* within the steering device 52. For example, based upon the degree (or rate) of steering at the steering wheel 26, the manual steering valve 28 may direct particular fractions of the flow from the pump 44 to either side of the piston 52*a*. Accordingly, the piston 52*a* may be moved within the cylinder of the steering device 42 to cause the hydraulic motors 16*b* to rotate the wheels 14 at different rates, and thereby steer the vehicle 10*c* in the direction indicated by the manual steering input. At a neutral orientation (e.g., a mid-point or "centered" orientation along a path of travel), the piston 52*a* may impose a zero steer condition, such that powering the front wheels 14 tends to drive the vehicle 10*c* substantially forward or backward (e.g., straight forward or backward). Such a neutral orientation may also be referred to as a "re-centered" or "zero-steer" orientation.

In certain implementations, when the vehicle 10*c* is operating in the manual steering mode, operation of the valve assembly 40*a* to actively control steering of the front wheels 14 could interfere with the control of front steering based upon the manual steering input at the steering wheel 26. Accordingly, when the vehicle 10c is being operated in the manual steering mode, the controller 58 may disable the valve assembly 40a (or a portion thereof) with respect to the steering of the front wheels 14 and thereby prevent the valve assembly 40a from controlling the steering device 52 (or otherwise controlling the steering of front wheels 14). In certain embodiments, for example, the controller 58 may determine that an operator is attempting to steer vehicle 10c manually based upon the steering sensor 30 detecting a manual steering input at the steering wheel 26. The controller 58 may then activate a blocker valve (see, e.g., FIG. 5) or other device associated with the valve assembly 40a, in order to prevent the valve assembly 40a from actuating piston 52a. In this way, in the manual steering mode, control of the steering of the front wheels 14 may depend primarily on manual steering input at the steering wheel 26 (e.g., rather than automated steering commands to the valve assembly 40a from the controller 58).

It will be understood that other implementations of the manual steering mode may also be possible. In certain embodiments, for example, the sensor 30 may detect a steering rate at steering wheel 26 (i.e., based on a manual steering input at the steering wheel 26) and may provide a corresponding electronic (or other) signal to control (directly or indirectly) steering of the front wheels 14. For example, the controller 58 may be configured to control the steering device 42 via the valve assembly 40a, based upon a steering rate sensed by the sensor 30 (i.e., based upon manual steering input). Alternatively (or additionally), the controller 58 may be configured to directly control the speeds of the pumps 16a based upon such a signal from the sensor 30. For example, the controller 58 may electronically control the speed of the pumps 16a based upon a steering rate detected by the steering sensor 30. Similarly, in certain embodiments, the sensor 30 may provide a control signal directly to the pumps driving the hydraulic motors 16b, or to various other devices, based on manual steering input to the steering wheel 26.

In certain embodiments, while the vehicle 10c is operating in the manual steering mode (with respect to the front wheels 14), the rear wheels 18 may be controlled automatically. For example, in the rear steering assist mode, which may be implemented simultaneously with the manual steering mode, the steering of the rear wheels 18 may be controlled automatically based upon manual steering input at the steering wheel 26 (or another steering input device). However, no direct mechanical link may be provided between the steering wheel 26 and the rear steering devices 42. For example, the steering sensor 30 (or another device) may detect the rate (or degree) of steering of the steering wheel 26, based upon the manual steering input, and may transmit signals representing this rate (or degree) to the controller 58. The controller 58 may then transmit corresponding steering commands to valve assembly 40b in order to control the rear steering. In certain embodiments, the valve assembly 40b may be utilized to control rear steering in the rear steering assist mode even if the valve assembly 40a has been disabled from controlling the steering of front wheels 14 (e.g., as described above).

In certain embodiments, as also noted above, the rear steering devices 42 may be utilized to steer the rear wheels 18 in the rear steering assist mode. For example, based upon steering commands from the controller 58, the valve assembly 40b may selectively direct hydraulic fluid flow from the pump 46 (or another pump) to each of the rear steering devices 42 in order to control the steering of each of the rear wheels 18, respectively. In certain embodiments, the same amount of flow may be directed to each of the left- and right-side steering devices 42, in order to effect approximately equal steering at each of rear wheels 18. In certain embodiments, different amounts of flow may be directed to the right-side device 42 and the left-side device 42, either because calibration of the steering system indicates that different signals are required at each steering device 42 to effect the same amount of steering at each of the respective steering devices 42, or because different rates of steering are desired at each steering device 42.

In certain embodiments, the rear steering devices 42 may also be included in a dual-path hydraulic circuit and may also employ hydraulic pistons similar to piston 52a to control steering of rear wheels 18. For example, a double-acting piston 42a (see FIG. 5) may be provided for each of the rear steering devices 42, with the pistons 42a configured, respectively, to rotate the rear wheels 18 on the casters 20. The valve assembly 40b may provide (or provide for) different fluid pressures at either side of a double-acting piston 42a within either (or both) of the rear steering devices 42, based upon the steering command received from the controller 58 (or from another device). In response to this pressure differential, each piston 42a may accordingly move within its respective cylinder, in order to mechanically turn the associated rear wheel 18.

The rear steering assist mode may be useful in various instances, including during operation of the vehicle 10c at elevated speeds (e.g., speeds exceeding 15 mph or more). At relatively low speeds, for example, the torque delivered to the front wheels 14 by the hydraulic motors 16b may be relatively large. Accordingly, even if the casters 20 do not naturally align the rear wheels 18 with the direction of travel of the vehicle 10c, the vehicle 10c may be capable of maintaining an appropriate path of travel by overpowering any resistance from the misalignment of the rear wheels 18. At higher speeds, however, the torque delivered to the front wheels 14 may be somewhat lower and the effect of misalignment of the rear wheels 18 may be somewhat more significant. Accordingly, it may be useful to actively align the rear wheels 18 with the path of travel of the vehicle 10c (i.e., to operate in the rear steering assist mode), so that the rear wheels 18 do not urge the vehicle 10c away from a desired path of travel.

In certain embodiments, one or more of the depicted double-acting pistons may alternatively be configured as a single-acting piston. For example, one or both of the pistons 42a may alternatively be configured as a single-acting piston controlled by the valve assembly 40b, with a valve of various known configurations being provided to control make-up oil for the pistons 42a.

It will be understood, however, that the rear steering assist mode may be useful at various speeds of the vehicle 10c, and need not be utilized solely when the vehicle 10c is traveling at relatively at high speeds. For example, active steering of the rear wheels 18 during steering of the front wheels 14 may decrease the turning radius of the vehicle 10c as a whole, which may result in improved operation of the vehicle 10c within a field, even at low speeds. As also described below, active steering of the rear wheels 18 may also be useful during automated steering of the front wheels 14 (e.g., for operation of the vehicle 10c in the automated steering mode during a harvesting operation).

In certain embodiments, as noted above, the vehicle 10c may also be configured to operate in an automated steering mode, in which the steering of the front wheels 14 and of the rear wheels 18 may be controlled automatically (i.e., not based upon manual steering input at the steering wheel 26). For example, a target path of travel for the vehicle 10c may be determined in various known ways. During operation of the vehicle 10, and based upon the target path of travel, the current position of the vehicle 10c (e.g., as determined based upon measurements by a GPS device 48), and various other factors, the controller 58 may then determine appropriate steering commands for the valve assembly 40a, in order to automatically control steering of the front wheels 14. Similarly, the controller may also provide steering commands to the valve assembly 40b, in order to automatically control steering of the rear wheels 18.

In certain embodiments, the vehicle 10c may be configured to automatically exit the automated steering mode upon receipt of a manual steering input from the operator. For example, if the vehicle 10c is operating in the automated steering mode and an operator nevertheless turns the steering wheel 26, this manual steering input may be detected by the steering sensor 30. Based upon the detected input, the controller 58 may cease providing active steering input to one or both of the valve assemblies 40a and 40b, and may, in certain implementations, actively disable one or both of the valve assemblies 40a and 40b.

The target path of travel for the vehicle 10c and appropriate automatic steering commands based upon the target path may be determined in various ways, based upon various factors. In certain embodiments, as noted above, the GPS device 48 (or a similar device) may be utilized in order to determine a target path of travel of the vehicle or to otherwise determine appropriate steering commands for the automated steering mode. For example, for a harvesting operation, a target path of travel for the vehicle 10c may extend in a relatively straight line across a field. As the vehicle 10c travels along the field, position information for the vehicle 10c from the GPS device 48, as well as other information (e.g., vehicle ground speed) may be utilized (e.g., by the controller 58) to determine whether the vehicle 10c has deviated (or is likely to deviate) from the straight line path. If a deviation (or an expected deviation) of a particular amount or degree from the target path of travel is detected, the controller 58 may provide appropriate commands to the valve assemblies 40a and 40b to correctively steer the front 14 and rear 18 wheels, respectively, and return the vehicle 10c to (or keep the vehicle 10c on) the path.

It will be understood that other configurations may be possible. For example, in certain embodiments, various controllers within the valve assembly 40a (or other valve assemblies) may receive location information directly from the GPS device 48, or the GPS device 48 may include a controller for providing appropriate GPS-based steering commands directly to the valve assemblies 40a and 40b. Similarly, in certain embodiments, the controller 58 (or another device) may include an integrated position tracker (e.g., an integrated GPS device) (not shown).

In certain embodiments, as noted above, because there is no direct mechanical control link between the steering wheel 26 and any of the valve assembly 40a and the steering devices 42, a common control architecture (e.g., the pump 44 and the steering device 52) may be utilized to control steering of the front wheels 14 in both the manual and the automated modes, without the need to disconnect (or disregard) a mechanical link between the steering wheel 26 and various steering devices to transition between the modes. Likewise, the rear wheels 18 may be controlled with the same devices in both the rear steering assist mode (in which steering of the rear wheels 18 is based upon manual steering input) and the automated steering mode (in which the rear wheels 18 are steered independently of manual steering input).

In certain embodiments, steering adjustments may be made simultaneously (or near-simultaneously) at both the front wheels 14 and the rear wheels 18, in order to implement effective steering control for the vehicle 10c. In certain embodiments, steering adjustments may be made continuously, or near-continuously, as vehicle 10c drives over a field.

Referring also to FIG. 5, a more detailed schematic of an example steering system is depicted, including example configurations of the valve assemblies 40a and 40b. It will be understood that the configuration presented in FIG. 5 represents only an example configuration for the disclosed steering system. For example, alternative systems contemplated by this disclosure may include various valve types and configurations other than those depicted in FIG. 5, in order to implement the contemplated steering control. It will further be understood that various other components and systems (including components and systems not depicted in FIG. 5) may interoperate with one or more portions of the system depicted in FIG. 5. For example, the pump 46 may be utilized to control steering of the rear wheels 18 as well as to lift and move the header 12 of the vehicle 10c.

In the embodiment depicted, the manual steering valve 28 is in hydraulic communication with the piston 52a, such that control of hydraulic flow through the valve 28 may move the piston 52a and thereby control the speeds of the hydraulic pumps 16a. The valve assembly 40a is also in hydraulic communication with the piston 52a, such that hydraulic flow through the valve assembly 40a may also move the piston 52a and thereby control the speeds of the hydraulic pumps 16a. As discussed in greater detail below, the system may be configured such that only one of the valve 28 and the valve assembly 40a controls the piston 52a simultaneously (e.g., depending on whether the vehicle 10c is operating in the manual steering mode of the automated steering mode).

To control the rear steering, the valve assembly 40b is in hydraulic communication with the rear steering devices 42, each of which includes a double-acting piston 42a. Each piston 42a may be in mechanical communication with the respective caster 20 or rear wheel 18 (not shown in FIG. 5), such that movement of each piston 42a may steer the associated rear wheel 18. In this way, hydraulic flow through the valve assembly 40b (e.g., as controlled by the controller 58 based upon a target path of travel or a manual steering input at the steering wheel 26 (not shown in FIG. 5)) may be utilized to control steering of the rear wheels 18.

As depicted in FIG. 5, the valve assemblies 40a and 40b may be configured similarly (i.e., may include similar valve types and inter-valve connections). For example, each valve assembly 40a and 40b may include a pilot-operated blocker valve (e.g., blocker valves 66a and 66b, respectively, operated by pilot valves 68a and 68b), various main flow control valves (e.g., variably-positioned main spool valves 70a and 72a, and variably-positioned main spool valves 70b and 72b, respectively), and various proportional control valves (e.g., pilot valves 74a and 76a, and pilot valves 74b and 76b, respectively) to control the main flow control valves. These and various other components of valve assemblies 40a and 40b may be in communication with the controller 58 via various signal lines (including lines not shown in FIG. 5), such that the controller 58 may be configured to control operation of the valve assemblies 40a and 40b to control steering of the front 14 and rear 18 wheels, respectively. As depicted, for example, electrical (e.g., current) signals provided by the controller 58 to the pilot valves 74a, 74b, 76a and 76b may cause a proportional (or other) opening, respectively, of the spool valves 70a, 70b, 72a, and 72b. Automatic steering of the front 14 and rear 18 wheels may then be controlled based upon this control of the spool valves 70a, 70b, 72a, and 72b.

The blocker valves 66a and 66b may be configured, respectively, to disable the valve assemblies 40a and 40b based upon receipt of an appropriate command (e.g., from the controller 58). As such, the blocker valves 66a and 66b may control, respectively, whether valve assemblies 40a and 40b are engaged in active control, respectively, of the front and rear steering. As depicted, for example, the blocker valves 66a and 66b control the flow of fluid from the pumps 44 and 46, respectively, to the main spool valves 70a and 72a and to the main spool valves 70b and 72b. As such, when disposed in a closed configuration (e.g., in a default state), the blocker valves 66a and 66b may starve the spool valves 70a, 72a, 70b and 72b of flow and thereby effectively disable steering of the front 14 and rear 18 wheels by the valve assemblies 40a and 40b.

In the manual steering mode, for example, the blocker valve 66a may be operated to cut off flow from the pump 44 through the spool valves 70a and 72a. Accordingly, in the manual steering mode, the manual steering valve 28, but not the valve assembly 40a, may be used to control steering of the front wheels 14 via the steering device 52. Similarly, when the vehicle is not operating in the automated or rear steering assist modes, the blocker valve 66b may be operated to cut off flow from the pump 46 through the spool valves 70b and 72b. Accordingly, no automatic control of the rear steering may be provided. (In certain embodiments, the blocker valve 66b may not be operated in this way, such that rear steering may still be controlled automatically via valve assembly 40b. As noted above, for example, the various vehicles 10 may be configured to operate simultaneously in both the manual steering mode for the front wheels 14 and the rear steering assist mode for the rear wheels 18.)

As depicted, the blocker valves 66a and 66b are operated by pilot valves 68a and 68b, respectively, with the pilot valves 68a and 68b both being operated by the pump 44. Similarly, the opening and closing of the main spool valves 70a, 70b, 72a, and 72b may be controlled, respectively, by the pilot valves 74a, 74b, 76a and 76b, with each of the pilot valves 74a through 76b also being operated by the pump 44. (It will be understood that other pump arrangements are also possible.) Through control of the main valves 70a, 70b, 72a, and 72b (e.g., as implemented through control of the pilot valves 74a, 74b, 76a, and 76b), the total flow through the valve assemblies 40a and 40b may be controlled, as well as the relative amount of hydraulic flow directed to opposing sides of the various double-acting pistons 42a and 52a. Accordingly, with appropriate calibration of valve gains for a given steering command (e.g., for a given electrical current signal), steering commands provided to the various pilot valves 74a, 74b, 76a and 76b may result in particular fluid flow through the various main valves 70a, 70b, 72a, and 72b and thereby in particular actuation of the pistons 42a and 52a. As discussed in greater detail above, this may result in the particular steering operations at the front 14 and rear 18 wheels.

Although the valve assemblies 40a and 40b are depicted as exhibiting generally the same arrangement of valves (i.e., of the various valves 66a through 76b), the assemblies 40a and 40b need not always be configured identically. In certain embodiments, for example, larger sized (or otherwise higher-capacity) valves may be utilized in the valve assembly 40b than in the valve assembly 40a. This may be appropriate, for example, in order to account for higher expected pressures and flow rates within the valve assembly 40b, as supplied by the higher-pressure pump 46 (as opposed to the lower-pressure charge pump 44). Calibration and adjustment of the various valves 66a through 76b may also vary between the valve assemblies 40a and 40b. For example, as a default configuration or as a result of adjustment by an operator, different proportional gains may be utilized for various of the different pilot valves 68a, 68b, 74a, 74b, 76a, and 76b.

Other configurations may also be possible. As depicted, for example, the outputs of each of the main spool valves 70b and 72b are combined into shared flow lines 96 and 98, such that the valves 70b and 72b collectively control both of the pistons 42a. In other embodiments, one or more valves (e.g., the valve 70b) may be provided for control of one of the pistons 42a, and a different one or more valves (e.g., the valve 72b) may be provided for independent control of the other of the pistons 42a.

Similarly, in certain embodiments, one or more of the various pilot valves 74a through 76b (or others) may be eliminated, and one or more of the main valves 70a, 70b, 72a, and 72b may be configured, correspondingly, to operate without a pilot. For example, one or more of the main valves 70a, 70b, 72a, and 72b may be configured as a 3-position, 4-way valve (not shown) that is closed to flow in its default position.

In the rear steering assist mode, as also noted above, the front wheels 14 may be steered manually and the valve assembly 40b may receive control signals based upon the manual steering input in order to provide assistive steering of rear wheels 18. As such, in the rear steering assist mode, the blocker valve 66b may be operated to permit hydraulic flow to the spool valves 70b and 72b. The steering sensor 30 may detect a particular rate (or degree) of steering at the steering wheel 26 (e.g., as may result from a manual steering input at the steering wheel 26). A corresponding control signal may then be provided to one or more of the pilot valves 74b and 76b in order to control the flow through the spool valves 70b and 72b. For example, an electronic signal may be provided by the controller 58, as determined based upon the manual steering input detected by sensor 30. The flow through the spool valves 70b and 72b may then control the movement of the pistons 42a within the rear steering device 42, and thereby control the steering of the rear wheels 18.

In the automated steering mode, in which the steering of the front wheels 14 and of the rear wheels 18 is automatically controlled, each of the blocker valves 66a and 66b may be operated to allow flow, respectively, to the spool valves 70a and 72a and to the spool valves 70b and 72b. As also noted above, this flow may be provided by the pump 44 for the valve assembly 40a and by the pump 46 for the valve assembly 40b. A target path for the vehicle 10c may be determined, and the controller 58 may use position information from the GPS device 48 to determine the deviation (or expected deviation) of the vehicle 10c from the target path. The controller 58 may then provide appropriate steering commands to the valve assemblies 40a and 40b (i.e., to the pilot valves 74a and 76a and the pilot valves 74b and 76b, respectively) in order to automatically steer the front 14 and rear 18 wheels.

With appropriate calibration, such automatic steering of the front 14 and rear 18 wheels may correct the deviation from, and otherwise cause the vehicle 10c to generally track, the target path of travel. For example, the GPS device 48 may provide to the controller 58 signals representing a current location of the vehicle 10c. The controller 58 may compare this current vehicle location to the target path of travel, in light of the current vehicle ground speed, degree of steering (e.g., the current orientation of the rear wheels 18 or the current speeds, respectively, of the two front wheels 14), and so on, in order to determine whether the vehicle 10c is deviating (or is expected to deviate) from the target path of travel. If a deviation is detected (or anticipated), an appropriate command may then be provided to one or more of the pilot valves 74a, 74b, 76a, and 76b in the valve assemblies 40a and 40b, in order to effect appropriate steering control via the control valves 70a, 70b, 72a, and 72b and the steering pistons 52a and 42a.

It will be understood that various adjustments may be possible to the system depicted in FIG. 5 (as well as other contemplated steering systems). In certain embodiments, for example, it may be possible for operators to adjust various parameters relating to the valve assemblies 40 and 40b, such as the sensitivity of a particular valve or the gain at a particular valve for a particular control signal. For example, an operator may selectively adjust the gain on various of the proportional pilot valves 74a, 74b, 76a, and 76b in order to control the relative amounts of hydraulic flow through the main valves 70a, 70b, 72a, and 72b (and thereby the degree of steering of the front 14 and rear 18 wheels) for a given steering command at the pilot valves 74a, 74b, 76a, and 76b.

In certain embodiments, adjustments made to the valve assemblies 40a and 40b with respect to a particular operating mode may not be applied in another operating mode. For example, in order to customize the steering of the rear wheels 18 of the vehicle 10c for the rear steering assist mode, an operator may adjust the gains of the pilot valves 74b and 76b of the valve assembly 40b. Such adjustment may be useful, for example, to increase (or decrease) the amount of steering of the rear wheels 18 (as controlled by the valve assembly 40b and the pistons 42a) for a given manual steering input at the steering wheel 26 (as sensed by the steering sensor 30) and thereby customize the rear steering assistance to the preferences of the operator. In certain embodiments, when the vehicle 10c transitions from the rear steering assist mode to the automated steering mode, the gains of the pilot valves 74b and 76b may be automatically returned to a predetermined level (or levels) in order to ensure appropriate coordination of the automatic front and rear steering.

As also noted above, in certain embodiments, the pump 44 may be a lower pressure pump than pump 46. Further, the pump 44 may be included in a hydraulic circuit that is not in hydraulic communication with the hydraulic circuit of the pump 46 (other than, potentially, draining to the same hydraulic tank). For example, the pump 44 may be a charge pump generally providing charge pressure to a charge pressure circuit 84, whereas the pump 46 may be a steering pump generally providing operating pressure to a steering pressure circuit 86. A charge pump, it will be understood, is generally used in hydraulic systems to ensure that a particular hydraulic circuit or device remains appropriately charged with fluid during normal operation. In practice, a charge pump not only keeps a particular circuit appropriately charged with fluid, but may also pressurize the circuit to a particular charge pressure. Typically, however, a charge pump does not provide operating pressure to motors or other devices. Using of a charge pump (i.e., the pump 44) to operate the front steering device 52, rather than using a separate, dedicated pump, may result in significant cost and space savings, as well as other benefits.

The hydraulic circuits 84 and 86 are indicated generally with brackets in FIG. 5. It will be understood that these brackets are approximate, and that some portion of the charge circuit 84 may extend into the left portion of FIG. 5. As depicted in FIG. 5, portions of the charge pressure circuit 84 that extend into the valve assembly 40b are depicted in darker relief than other flow lines of the valve assembly 40b. It can be seen, accordingly, that although pressure from the charge pump 44 may be utilized to operate the pilot valves 74b and 76b of the valve assembly 40b, the charge pressure circuit 84 is not in hydraulic communication with the steering pressure circuit 86. In this way, although the valve assembly 40b may be partially controlled by flow from the charge pump 44, pressurized flow from the charge pump 44 is not directly used to move the pistons 42a (and thereby steer the rear wheels 18). As also noted above, the charge pump 44 may also provide operating and pilot pressure to the valve assembly 40a in the automated steering mode, such that flow from the pump 44 is utilized to control the valve assembly 40a and to move the piston 52a. Similarly, the charge pump 44 may also provide pressurized flow through the manual steering valve 28 in the manual and rear steering assist modes, also in order to move the piston 52a.

Because a charge pressure circuit (e.g., the circuit 84) may generally be configured to operate at lower pressures than other circuits (e.g., the steering pressure circuit 86 or the hydraulic drive circuit 16), a charge pump (e.g., the pump 44) may generally be configured to supply lower pressure hydraulic fluid than other pumps (e.g., the pump 46 or the pump 16a). As such, for example, the pump 44 may be configured to provide fluid at relatively low pressures (e.g., between approximately 150 psi and 700 psi). In contrast, the pump 46 may be configured to provide fluid at relatively high pressures (e.g., between approximately 1200 and 3600 psi). This configuration of the pump 46 may be appropriate, for example, because the pump 46 may need to provide enough pressure to directly adjust the orientation of the rear wheels 18 through direct movement of pistons 42a. During operation of the vehicle 10c, this mechanical adjustment of the rear wheels 18 may sometimes require significant force (e.g., to overcome the weight of the vehicle 10c, as well as various ruts or other obstacles on the ground). Accordingly, it may be appropriate to provide a higher pressure pump for the pump 46. In contrast, the pump 44 may need to provide only enough pressure to move piston 52a, with the higher pressure drive pump 16a providing motive power for the wheels based on the position of the piston 52a.

In the embodiment depicted, the valve assembly 40a may be fully included in the charge pressure circuit 84, such that the various valves of the valve assembly 40a may be fed with charge pressure from the pump 44 and may also be actively operated by the pressure from the pump 44. For example, in order to automatically control the steering of the front wheels 14, the pilot valves 74a and 76a may be operated by hydraulic fluid from the pump 44 (and the charge circuit 84) in order to open or close the spool valves 74a and 76a. (The pilot valve 68a may also be charged and operated by flow from the pump 44.) Further, the spool valves 74a and 76a may themselves regulate flow from the pump 44 (and the charge circuit 84) to the steering device 52, in order to direct the steering of the front wheels 14. Again, the use of the lower pressure charge circuit 84 to operate the valve 40a, as well as to provide charge pressure thereto, may be possible because the piston 52a may not directly move the front wheels 14, but rather may steer the front wheels 14 by controlling the speed of the higher-pressure drive pumps 16a.

Also as depicted, the charge pressure circuit 84 is configured such that the charge pressure pump 44 provides flow through the manual steering valve 28 during the manual steering mode. In this way, even if the valve assembly 40*a* is not being utilized to control steering of the front wheels 14, the pump 44 may still be utilized to move the piston 52*a* and thereby control the speed of the front wheels 14. As noted above, the charge pressure pump 44 is also utilized to operate the valve assembly 40*a* during the automated steering mode, and to provide operate the pilot valves 68*b*, 74*b*, and 76*b* in the valve assembly 40*b* during the rear steering assist and automated steering modes.

In contrast to the valve assembly 40*a*, in the embodiment depicted, the valve assembly 40*b* may be integrated into the steering pressure circuit 86 as well as the charge pressure circuit 84. For example, the pump 44 may provide charge pressure to the valve assembly 40*b*, with flow from the pump 44 operating the various pilot valves 68*b*, 74*b* and 76*b*. The steering device 42, however, may be operated with hydraulic flow from the pump 46 and the steering pressure circuit 86, as routed through the various pilot-operated valves 66*b*, 70*b*, and 72*b*. As noted above, the pump 46 and the steering pressure circuit 86 may be generally configured to operate at significantly greater pressures than the pump 44 and the charge pressure circuit 84. This may be useful, for example, in overcoming the resistance of ground features (e.g., ruts, mounds, rocks, branches, and so on) to the pivoting of the wheels 18.

The use of a higher pressure device for the pump 46 than for the pump 44 (e.g., utilizing a charge pump for the pump 44) may also be useful if the pump 46 is utilized to operate other systems of the vehicle 10*c*. For example, a priority valve 78 may be provided between the pump 46 and the valve assembly 40*b*. The valve 78 may be configured to control the routing of flow from the pump 46 to the valve assembly 40*b* as well as to various other systems (not shown). Where operation of the other systems (e.g., a lift or float system for the header 12) may require significant hydraulic pressures, use of a sufficiently high pressure pump for the pump 46 may thus facilitate simultaneous (or other) operation of rear steering control (via the valve assembly 40*b*) and of the other system by the pump 46. Even if simultaneous operation is not necessary, the use of a higher pressure pump for the pump 46 may allow a single pump to actuate the pistons 42*a* as well as devices of other various systems (not shown).

The configuration of the pump 44 as a charge pump, which may also provide charge pressure to various other systems (not shown) of the vehicle 10*c*, may also provide significant cost and space savings for the vehicle 10*c*. For example, where a charge pump is already utilized for other systems of the vehicle 10*c*, the use of the charge pump to operate the valve assembly 40*a* and to operate the piston 52*a* may allow automatic front steering to be implemented without the need for an additional pump.

In certain implementations, control of the steering of the vehicle 10*c* may be implemented as part of a multi-mode steering ("MMS") method such as MMS method 200. The MMS method 200 may be represented as various instruction sets and subroutines stored on a storage device forming part of (or otherwise coupled to) the controller 58, and may be executed by one or more processors and one or more memory architectures (e.g., as included in or associated with the controller 58). In certain implementations, the MMS method 200 may be a stand-alone method. In certain implementations, the MMS method 200 may operate as part of, or in conjunction with, one or more other methods or processes and/or may include one or more other methods or processes. Likewise, in certain implementations, the MMS method 200 may be represented and implemented by an entirely hardware-based configuration or as a hydraulically or mechanically operated control structure, in addition or as an alternative to a configuration having the MMS method 200 as a set of instructions stored in a storage device (e.g., a storage device included in or associated with the controller 58). For the following discussion, the MMS method 200 will be described for illustrative purposes. It will be understood, however, that other implementations may be possible.

Figure 6:
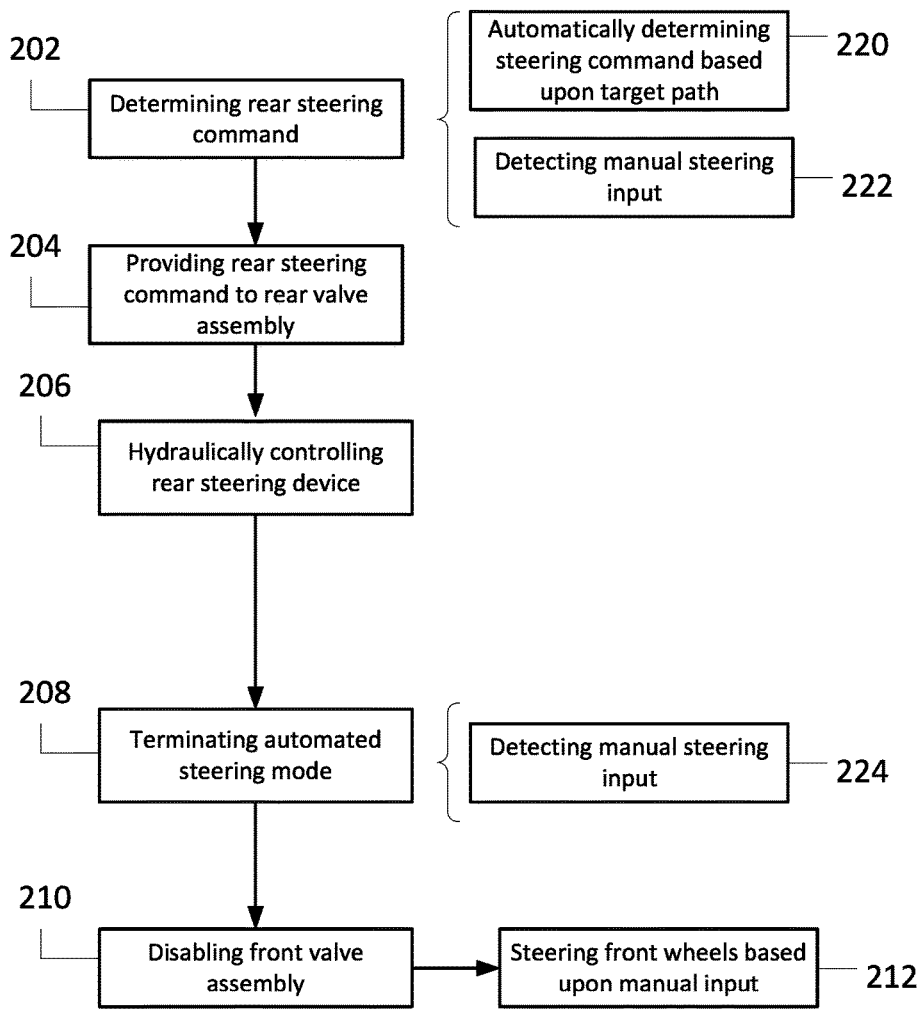
FIG. 6 is a diagrammatic view of a steering control method that may be implemented with the hydraulic system of FIG. 5.

Referring also to FIG. 6, in order to control steering of the rear wheels of a vehicle, the MMS method 200 may include determining 202 a rear steering command (e.g., with the controller 58). In the automated steering mode, the determined 202 rear steering command may be automatically determined 220 based upon a target path of travel for the vehicle. For example, a controller may utilize GPS and other information in order to determine whether a vehicle is deviating (or is expected to deviate) from a target path of travel and may automatically determine 220 a rear steering command based on that deviation (or expected deviation). In the rear steering assist mode, the rear steering command may alternatively be determined 202 based upon detecting 222 a manual steering input. For example, a steering sensor may detect 222 a manual steering input at a steering input device and may transmit a corresponding signal to a controller. The controller may then determine 202 a rear steering command based upon the detected 222 manual input.

Once determined 202, the steering command may be provided 204 to a rear valve assembly. The rear valve assembly may then hydraulically control 206 a rear steering device in order to steer one or more rear wheels. For example, a controller may provide 204 an electronic (e.g., current) signal to one or more pilot valves included in the rear valve assembly. The various pilot valves may be configured, in response to the provided 204 signal, to control other valves in the rear valve assembly and thereby control the hydraulic flow through the rear valve assembly in order to control rear steering. For example, the pilot valves may operate two variably-adjustable spool valves in order to selectively port hydraulic fluid to either side of two double-acting cylinders and thereby to steer two associated rear wheels.

In certain implementations, the automated steering mode may be terminated 208 based upon detecting 224 a manual steering input. For example, during the automated steering mode, rear steering may be hydraulically controlled 206 at a rear steering device with steering commands that have been automatically determined 220 based upon a target path of travel for the vehicle. In the automated steering mode, accordingly, an operator may not need to provide any manual steering input at the relevant steering input device (e.g., a steering wheel). Indeed, in certain implementations, detecting 224 a manual steering input at a steering input device may be taken as an indicator that an operator wishes to exit the automated steering mode and manual control may be reinstated accordingly. In certain implementations, this may correspond to a disabling 210 of a front steering valve, and the steering 212 of the front wheels based upon manual steering input. In certain implementations, the vehicle may be transitioned to the rear steering assist mode, with manual steering control of the front wheels and automatic steering control of the rear wheels.

Figure 7:
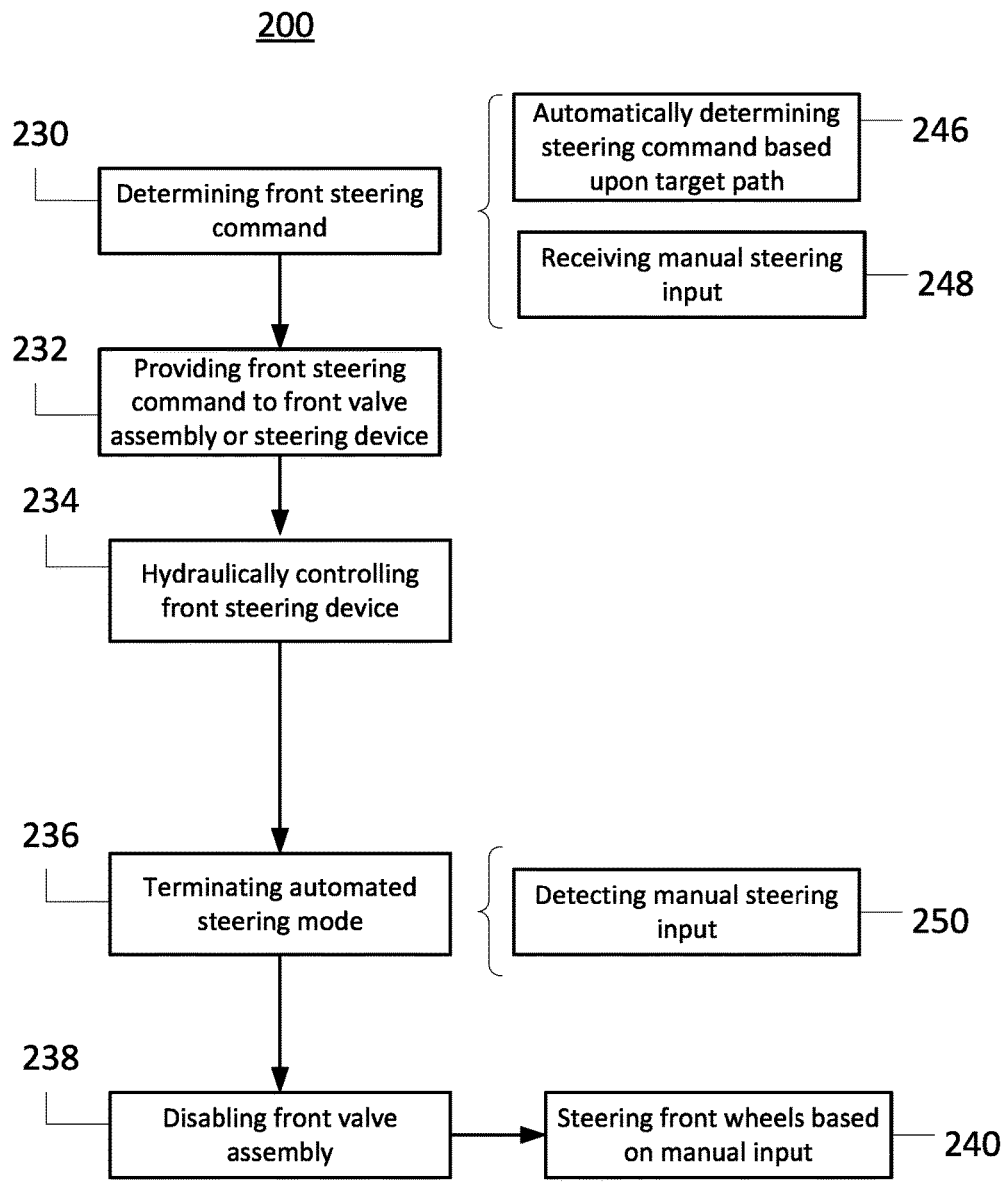
FIG. 7 is another diagrammatic view of the steering control method of FIG. 6.

Referring also to FIG. 7, in order to control steering of the front wheels of a vehicle, the MMS method 200 may include determining 230 a front steering command. In the automated steering mode, the determined 230 front steering command may be automatically determined 246 based upon a target path of travel for the vehicle. For example, a controller may utilize GPS and other information in order to determine whether a vehicle is deviating (or is expected to deviate) from a target path of travel and may automatically determine 246 a rear steering command based on that deviation (or expected deviation). In the manual steering mode, the front steering command may alternatively be determined 230 based upon receiving 248 a manual steering input. For example, a manual steering input may be received 248 at a steering input device (e.g., a steering wheel), such that a steering valve in communication with the steering input device provides different hydraulic steering commands (i.e., different porting of hydraulic flow) based upon the manual steering input.

Once determined 230, the steering command may be provided 232 to a front steering device or to a front valve assembly in communication with the front steering device. In this way, the front steering device may be hydraulically controlled 234 in order to control the front steering. For example, in the automated steering mode, a steering command may be determined 246 by a controller based upon a target path. The controller may then provide 232 an electronic (e.g., current) signal to one or more pilot valves included in the front valve assembly. The various pilot valves may be configured, in response to the provided 232 signal, to control other valves in the front valve assembly and thereby control the hydraulic flow through the front valve assembly in order to control rear steering. For example, the pilot valves may operate two variably-adjustable spool valves in order to selectively port hydraulic fluid to either side of a double-acting cylinder and thereby to cause pumps for driving the front wheels to rotate at different speeds. In the manual mode, in contrast, actuation of a manual steering valve by a steering input device may cause the valve to provide 232 a hydraulic signal directly to the front steering device in order to similarly steer the front wheels.

In certain implementations, the automated steering mode may be terminated 236 based upon detecting 250 a manual steering input. For example, during the automated steering mode, front steering may be hydraulically controlled 234 at a front steering device with steering commands that have been automatically determined 246 based upon a target path of travel for the vehicle. In the automated steering mode, accordingly, an operator may not need to provide any manual steering input at the relevant steering input device (e.g., a steering wheel). Indeed, in certain implementations, detecting 236 a manual steering input at a steering input device may be taken as an indicator that an operator wishes to exit the automated steering mode and manual control may be reinstated accordingly. In certain implementations, this may correspond to a disabling 238 of a front steering valve, and the steering 240 of the front wheels based upon manual steering input.

In certain embodiments, it may be useful to disable automatic steering of the front 14 or rear 18 wheels if it is determined that a relevant control valve has become stuck (or if another steering fault is detected). Referring again to FIG. 5, for example, if a valve within the valve assembly 40b (e.g., one or both of the main spool valves 70b and 72b) becomes stuck (or otherwise malfunctions), hydraulic pressure at the rear steering device 42 may tend to lock the rear wheels 18 in a particular orientation. This may result in poor tracking by the rear wheels 18 of the steering executed at the front wheels 14, and in undesirable drag on the vehicle 10c (e.g., if the rear wheels 18 are locked by a stuck valve at an inappropriate angle, with respect to the direction of travel of the vehicle 10c).

In certain embodiments, in order to determine whether a valve within the valve assembly 40b has become stuck (or is otherwise malfunctioning), a pressure sensor (e.g., the pressure sensor 92) may be included in (or otherwise placed in hydraulic communication with) the valve assembly 40b (or another valve assembly). If a stuck valve (or other detrimental condition) is detected, based upon pressure readings from such a pressure sensor, rear steering control by the valve 40b may be selectively disabled.

As depicted, the pressure sensor 92 is disposed in hydraulic communication with certain outlet lines 94 of both of the main spool valves 70b and 72b of the valve assembly 40b. Due to the configuration of the valves 70b and 72b, these outlet lines 94 may be in hydraulic communication with the outlet lines 96 leading from the valves 70b and 72b to the steering devices 42 when the valves 70b and 72b are being utilized to control the steering devices 42. Accordingly, the pressure sensor 92 may be configured to detect an outlet pressure for either of the valves 70b and 72b that may correspond to a control pressure provided by the valve assembly 40b to the steering devices 42 (i.e., a control pressure within either of the outlet lines 96). As depicted, the pressure sensor 92 is in communication with both of the valves 70b and 72b, such that the pressure sensor 92 is configured to detect the higher of the outlet pressures, respectively, of the two valves 70b and 72b. Other configurations may also be possible.

If the pressure measured by the pressure sensor 92 does not match the expected pressure for a particular steering command (e.g., a command by the controller 58 to the pilot valves 74b and 76b for actuation of the spool valves 70b and 72b), it may be determined that one (or both) of the spool valves 70b and 72b have malfunctioned (e.g., are stuck). Accordingly, the controller 58 may cause the blocker valve 66b to cut off hydraulic flow to the valve assembly 40b and thereby disable the valve assembly 40b from controlling the steering of the rear wheels 18. Similarly, if a pressure measured by the pressure sensor 92 does not match the expected pressure in the absence of a particular steering command, it may be determined that one (or both) of the spool valves 70b and 72b have malfunctioned (e.g., are stuck). Accordingly, the controller 58 may again cause the blocker valve 66b to cut off hydraulic flow to the valve assembly 40b and thereby disable the valve assembly 40b from controlling the steering of the rear wheels 18.

Various control strategies may be implemented using the pressure sensor 92 in order to address various potential issues with the valve assembly 40b. In certain implementations, as also noted above, the pressure sensor 92 may be utilized to monitor the outlet pressures of the main valves 70b and 72b. Upon detection of a particular pressure by the sensor 92, and based upon various other factors, including the speed of the vehicle 10c, the nature of the present (or previous) steering commands provided to the valve assembly 40b (or individual valves thereof), and so on, the blocker valve 66b may then be operated to disable the valve assembly 40b. For example, if the vehicle 10 is traveling at a rate exceeding a threshold speed, and no steering command is being presently provided to the valve assembly 40b, a malfunction of the valve assembly 40b may be identified based upon the pressure sensor 92 detecting a pressure that is greater than a particular threshold pressure. Similarly, if the vehicle 10 is traveling above a threshold speed, and a steering command is presently being provided to the valve assembly 40*b*, a malfunction of the valve assembly 40*b* may be identified based upon the pressure sensor 92 detecting a pressure that fails to increase by a threshold amount (or otherwise appropriately change) within a particular time after the start of the steering command.

In certain implementations, such a strategy may usefully disable the valve assembly 40*b* when a particular valve of the valve assembly 40*b* is stuck, but may not disable the valve assembly 40*b* based simply upon transient pressure signals. For example, as the vehicle 10*c* travels along a field, impacts on the rear wheels 18 (e.g., from stones, logs and so on) may introduce transient pressure spikes (and other fluctuations) into the valve assembly 40*b* via the double-acting pistons 42*a* of the steering devices 42. Accordingly, the pressure measured at the pressure sensor 92 may exhibit transient spikes (and other fluctuations) that are not related to stuck valves within the valve assembly 40*b* (or other malfunctioning of the valve assembly 40*b*). In certain implementations, by controlling the blocker valve 66*b* based upon pressure readings at the pressure sensor 92 only when the vehicle is traveling above a threshold speed, unwarranted disabling of valve assembly 40*b* may be avoided. In certain implementations, a threshold speed of 15 miles per hour (or higher) may be utilized.

In certain implementations, control of the valve assembly 40*b* based upon pressure readings at the pressure sensor 92 (or similar control of the valve assembly 40*b* or of another valve assembly) may be implemented as part of a steering fault detection ("SFD") method such as SFD method 300. The SFD method 300 may be represented as various instruction sets and subroutines stored on a storage device forming part of (or otherwise coupled to) the controller 58, and may be executed by one or more processors and one or more memory architectures (e.g., as included in or associated with the controller 58). In certain implementations, the SFD method 300 may be a stand-alone method. In certain implementations, the SFD method 300 may operate as part of, or in conjunction with, one or more other methods or processes and/or may include one or more other methods or processes. Likewise, in certain implementations, the SFD method 300 may be represented and implemented by an entirely hardware-based configuration or as a hydraulically or mechanically operated control structure, in addition or as an alternative to a configuration having the SFD method 300 as a set of instructions stored in a storage device (e.g., a storage device included in or associated with the controller 58).

For the following discussion, the SFD method 300 will be described for illustrative purposes. It will be understood, however, that other implementations may be possible. Further, although certain examples herein discuss implementing the method 300 with respect to the valve assembly 40*b* and the controller 58, it will be understood that other implementations may utilize (and control) other devices.

Figure 8:
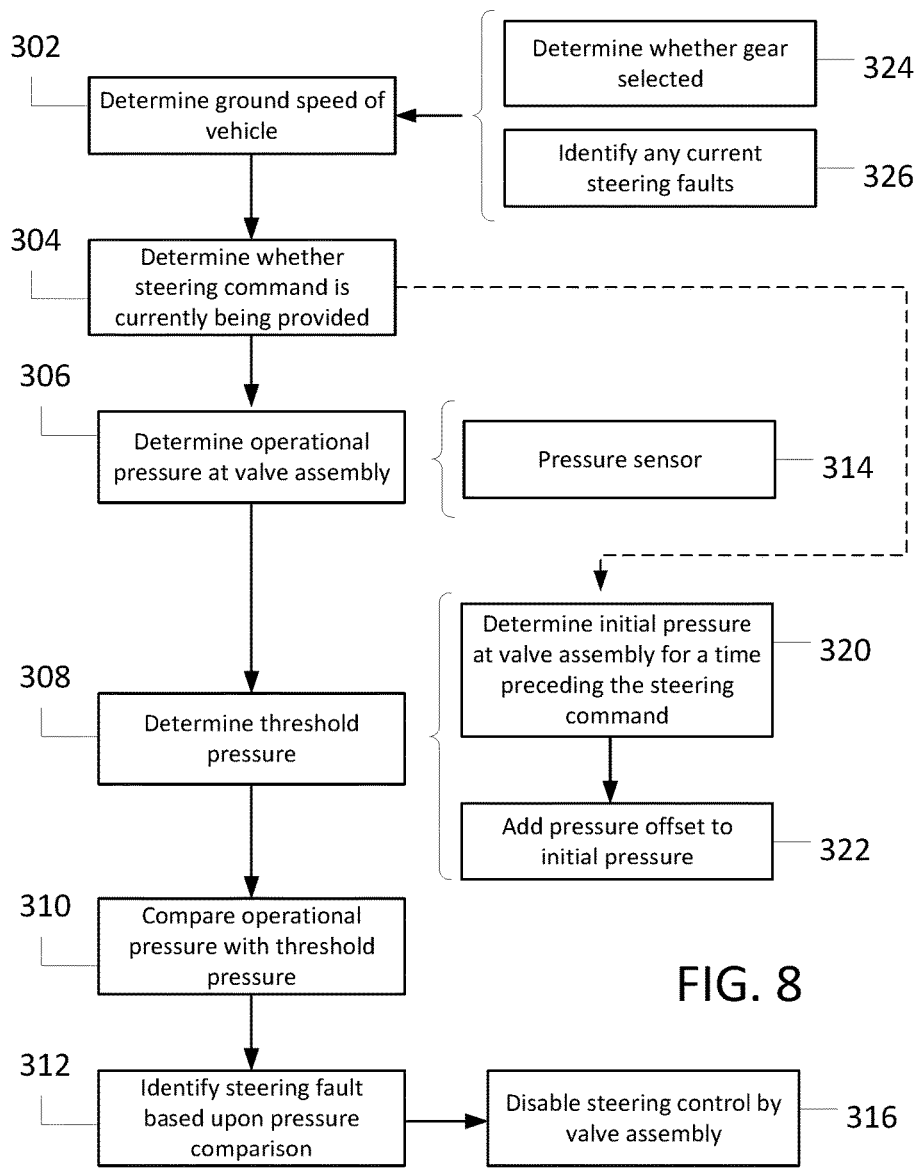
FIG. 8 is a diagrammatic view of a fault detection method that may be implemented for the hydraulic system of FIG. 5.

Referring also to FIG. 8, in certain implementations the SFD method 300 may include determining 302 a ground speed of the agricultural vehicle. For example, a wheel speed sensor (not shown), an engine speed sensor (not shown), the GPS device 48, or another device (or devices) may be utilized to determine the rate at which the vehicle is traveling over the ground. In certain implementations, the SFD method 300 may proceed only if the determined 302 ground speed exceeds a particular threshold (e.g., 15 mph or higher).

Other threshold determinations may also be made. In certain implementations, for example, the method 300 may include determining 324 whether a gear has been selected for operation of the vehicle. If no gear has been selected, the vehicle may not be actively traveling and the method 300 may terminate without identifying a fault in the relevant valve assembly. In certain implementations, the method 300 may include identifying 326 whether the vehicle is currently subject to any known steering or other faults (e.g., a rear steering fault previously identified by the method 300 or a steering fault in the relevant pressure sensor (e.g., the sensor 92). If an ongoing fault is identified 326, the method 300 may also terminate (e.g., because the relevant control systems may have already been disabled, in light of the identified 326 ongoing fault).

If appropriate threshold determinations are satisfied (e.g., if an appropriate ground speed is determined 302, the vehicle is determined 324 to be in gear, and no other ongoing faults are identified 326), method 300 may include determining 304 whether a steering command is currently being provided to the valve assembly 40*b*. For example, with respect to the vehicle 10*c*, the controller 58 may determine 304 whether the controller 58 is currently providing a steering command to the pilot valves 74*b* and 76*b*, in order to control steering of the rear wheels 18. If a steering command is not determined 304 to be currently provided to the relevant valve assembly (e.g., the valve assembly 40*b*), the method 300 may terminate and without identifying a fault in the valve assembly.

The method 300 may also include determining 306 an operational pressure at the valve assembly 40*b*. As depicted, the operational pressure may be determined 306 by the pressure sensor 92 and may indicate the greater of the output pressures, respectively, of the main valves 70*b* and 72*b*. Other arrangements may be possible.

If an appropriate ground speed is determined 302 (or other threshold determinations are met), and it is determined 304 that a steering command is currently being provided, the method 300 may include determining 306 an operational (e.g., current) pressure at the relevant valve assembly. In certain implementations, a pressure sensor 314 may be utilized to determine 306 the pressure of one or more hydraulic signals being provided by the valve assembly to a steering device. For example, the pressure sensor 92 (see FIG. 5) may be configured to determine 306 the larger of the output pressures of the valves 70*b* and 72*b* for control of the steering devices 42.

A threshold pressure may be determined 308, based upon one or more of the determined 302 ground speed and the determination 304 of whether a steering command is being provided to the valve assembly 40*b*. The determined 308 threshold pressure may vary based on the determined 302 ground speed, whether a steering command has been determined 304, and various other factors. For example, a larger pressure threshold (e.g., between 1500 psi and 2300 psi) may be determined 308 if it is determined 304 that no steering command is being provided and if the ground speed of the vehicle is determined 302 to be relatively high (e.g., 15 mph or higher). A smaller pressure threshold may be determined 308, however, in other cases. (e.g., if it is determined 304 that a steering command is currently being provided).

In certain implementations, the pressure threshold may be determined 308 based upon an expected change in operating pressure after implementation of a particular steering command. For example, where it has been determined 304 that a steering command is being provided to the relevant valve assembly (e.g., the valve assembly 40*b*), an initial pressure at the valve assembly may be determined 320, for a time preceding the start of the determined 304 steering command. In certain implementations, for example, the pressure sensor 92 may be configured to continually determine 306 pressure data, such that the method 300 may include interrogating previously-recorded pressure measurements in order to determine 320 an operating pressure immediately prior to the start of a steering command (i.e., an initial pressure). A particular offset (e.g., as based upon the particular steering command, the determined 302 vehicle speed, or other factors) may then be added 322 to the determined 320 initial pressure in order to determine 308 the appropriate threshold pressure.

With the threshold pressure and the pressure at the relevant valve assembly (or other device) having been determined 308 and 304, the operational pressure at the valve assembly may be compared 310 to the threshold pressure. Based upon this comparison 310, a steering fault may be identified 312, and control of the rear hydraulic steering by the relevant valve assembly 40b may be disabled 316, as appropriate. For example, if it has been determined 304 that no steering command is currently being provided, a steering fault (e.g., a stuck valve) may be identified 312 based upon the operational pressure exceeding the determined 308 threshold pressure. Steering control by the valve assembly may then be automatically disabled 316. For example, in the vehicle 10c, the blocker valve 66b may be operated (e.g., via electronic control of the pilot valve 68b) in order to disable 316 the valve assembly 40b.

Similarly, if it has been determined 304 that a steering command is currently being provided, a steering fault (e.g., a stuck valve) may be identified 312 based upon the operational pressure failing to exceed the determined 308 threshold pressure within a particular amount of time after the steering command has been provided. For example, in the vehicle 10c, if a steering command to the valve assembly 40b does not result in a particular pressure increase at the pressure sensor 92 within a particular amount of time (e.g., 500 ms) of the steering command being provided, the blocker valve 66b may be operated to disable 316 the valve assembly 40b.

Referring again to FIG. 5, when the vehicle 10c (or 10a or 10b, and so on) is placed in a particular state, the various contemplated steering control systems may automatically return various steering components (e.g., pistons 42a and 52a of the steering devices 42 and 52) to a default state. For example, upon detecting (in various known ways) that the vehicle 10c is in a parked state, the valve assembly 40a may be controlled to automatically orient the piston 52a within the cylinder of the steering device 52. In this way, when the vehicle 10c is taken out of park it will be configured to initially travel in a straight, forward (or reverse) direction.

In certain implementations, for example, upon detecting that the vehicle 10c has been placed in park, the controller 58 may direct the valve assembly 40a to automatically re-center the piston 52a within the cylinder of the steering device 52. This re-centering of the piston 52a may also, for example, usefully place the drive pumps 16a in a neutral state, such that the pumps 16a cannot over-run the parking brake.

As also noted above, such an orientation of the piston 52a (or another a steering device or component thereof) may be viewed as a neutral, zero-steer, or "re-centered" state orientation. It will be understood that certain steering devices, including the piston 52a, may be in a neutral or zero-steer state even if not oriented precisely at the center of a relevant range of motion (i.e., even if not fully "centered"). As such, it will be understood that a "re-centered" state, may simply refer to the zero-steer or neutral orientation of a steering device (e.g., the piston 52a), rather than necessarily indicating a physically centered location of the steering device itself. Likewise, it will be understood that a small amount of steering (e.g., steering of a degree or so) may sometimes occur, even in a zero-steer state, In the examples discussed below, re-centering of steering devices for the front wheels 14 may be discussed in detail. It will be understood that, in certain embodiments, various adjustments to the rear wheels 18 (e.g., via the rear steering devices 42) may also be made based upon detecting a particular vehicle state. For example, the valve assembly 40b may operate to re-center the rear pistons 42a of the steering devices 42, such that when the vehicle 10c is taken out of park the rear wheels 18 may be disposed for straight, forward (or reverse) travel. Alternatively, in certain embodiments, the valve 40a (or the valve 40b) may simply be turned off (e.g., through actuation of the blocker valves 66a or 66b) upon detection of a particular vehicle state (e.g., upon detecting that the vehicle 10c has been placed in park). In certain embodiments, position sensors (not shown) may be provided for the pistons 42a, the rear wheels 18, or other components, which sensors may be configured to detect the orientation of the rear wheels 18 such that the rear wheels 18 may be appropriately re-centered.

As noted above, it may be useful to re-center a steering system (i.e., to dispose the system such that no steering of the relevant wheels is effected) for various reasons. Re-centering steering for hydraulically driven wheels may, for example, assist in ensuring that steering commands do not cause the wheels to over-run a park brake. Re-centering may also help to ensure that excessive hydraulic (or other) pressure is not stored within a steering (or drive) system, such that the relevant vehicle does not move unexpectedly when removed from park. In certain implementations, the steering of the vehicle 10c (or other similar vehicles) may be re-centered through a Steering Re-centering ("SR") method, such as SR method 400.

Figure 9:
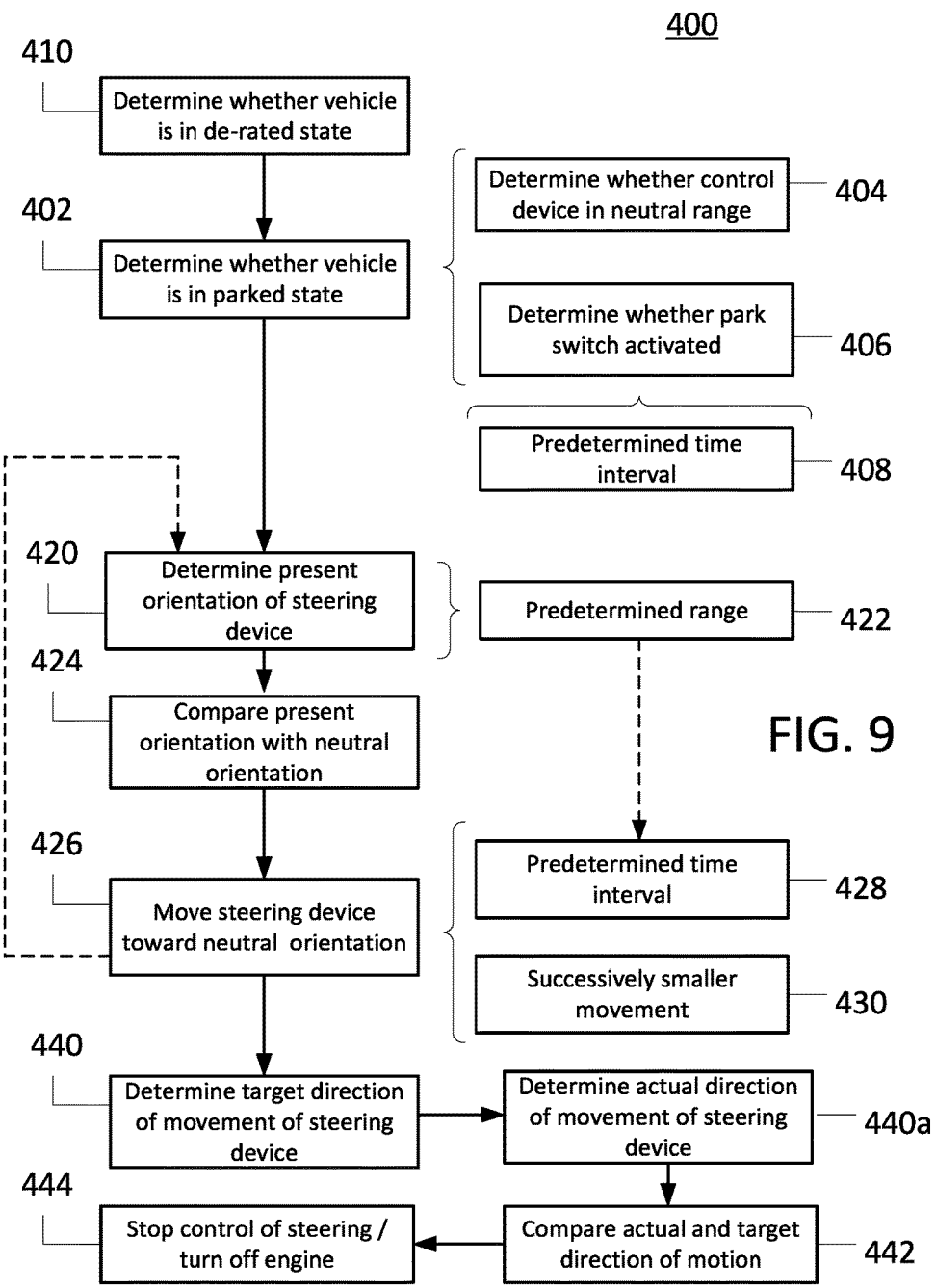
FIG. 9 is a diagrammatic view of another steering control method that may be implemented with the hydraulic system of FIG. 5.

Referring also to FIG. 9, the SR method 400 may include determining 402 whether the agricultural vehicle is in a parked state. In certain implementations, whether the vehicle is in a parked state may be determined 402 based upon sensors associated with hydraulic (or other) control devices for the vehicle. For example, determining 402 whether a vehicle is parked may include determining 404 whether a control handle (e.g., a lever, dial, or knob), or other control device for control of vehicle movement (e.g., a button, set of buttons, graphical user interface, and so on) is disposed within a "neutral" range, at which no forward or rearward movement is commanded. With respect to the vehicle 10c, for example, the hydraulic control lever 32 (see FIG. 1) may be configured to be moved forward for forward drive and rearward for reverse drive. At a range of orientations between various forward and rearward positions, the control lever 32 may be treated as being in neutral (i.e., as commanding neither forward nor rearward travel). When the vehicle 10c is in a parked state, the drive system for vehicle 10c is also typically in neutral. Accordingly, it may be useful to determine 402 a parked state of the vehicle 10c based upon determining 404 the orientation of the control lever 32.

Whether a vehicle is in a parked state may also be determined 402 based upon determining 406 whether a park switch has been activated. In certain implementations, a park switch may be a mechanical switch, configured to be activated (e.g., triggered) by movement of a control handle. In the vehicle 10c, for example, a mechanical switch 32a (see FIG. 1) may be disposed such that the hydraulic control lever 32 triggers (or releases) the switch 32a when the control lever 32 is secured (at least somewhat) in neutral.

This may have various effects, such as the automatic engagement of a park brake for the vehicle 10c. Whether the vehicle 10c is in a parked state may accordingly be determined 402 based upon, at least in part, determining 406 whether a park switch (e.g., the switch 32a) has been activated by the lever 32. In other embodiments, a park switch may be configured to be activated by a feature other than a control handle (e.g., directly by manual manipulation).

In certain implementations, the method 400 may include determining 402 that a vehicle is in a parked state based upon determining 404 that a control handle of the vehicle has been in a neutral range for a first predetermined time interval 408. This may be useful, for example, to verify that the vehicle is actually in a parked state, before automatic re-centering of the relevant steering is commanded. For example, when an operator uses the control lever 32 to transition the vehicle 10c from forward to reverse travel, the control lever 32 may be moved through the neutral range by the operator. In order to avoid commanding an automatic re-centering of the front wheels 14 in such a case (and others), it may be useful to determine 402 a parked state of the vehicle 10c only if the control lever 32 is determined 404 to be in its neutral range for a particular timer interval 408 (e.g., 1.5 seconds or more).

In certain implementations, the method 400 may additionally (or alternatively) include determining 402 that a vehicle is in a parked state based upon determining 406 that a park switch has been activated for the first (or another) predetermined time interval 408. Again, this may be useful to verify that the park switch has not been accidentally (and momentarily) activated and, accordingly, that the vehicle is actually in a parked state. For example, when the control lever 32 passes through the neutral range it may tend to brush against or otherwise temporarily activate the park switch 32a, even if no parked state is intended by the operator. In order to avoid an unwanted automatic re-centering of the front wheels 14, it may accordingly be useful to determine 402 a parked state of the vehicle 10c only if the park switch 32a is determined 406 to have been activated for a particular timer interval 408 (e.g., 1.5 seconds or more).

In certain implementations, it may be useful to implement automatic re-centering without the delay of the predetermined time interval 408 (or other time intervals) for determining 404, 406 control handle orientation and park switch activation. For example, where a vehicle has been de-rated (e.g., a maximum output of an engine, hydraulic pump, or other device adjusted downward), it may be useful to implement automatic re-centering promptly upon determining 402 any appropriate indicator of a parked state. This may be appropriate, for example, because conditions resulting in the de-rating of a vehicle (e.g., falling oil pressure, excessive coolant temperature, contradictory signals from related devices, such as a control lever and related park switch, and so on) may be more likely to experience operational issues. As such, when a vehicle has been de-rated and an appropriate re-centering trigger identified (e.g., activation of a park switch determined 406), it may be useful to automatically re-center a steering system without significant delay (e.g., without waiting for the time interval 408).

Accordingly, in certain implementations, the method 400 may include determining 410 whether a vehicle is in a de-rated state. The method 400 may then further include determining 402 that a vehicle is in a parked state (i.e., that automated re-centering of the wheels is appropriate) based upon determining 410 a de-rated state of the vehicle. In certain implementations, the determination 410 of the de-rated state may directly prompt determination 402 of the parked state. For example, in certain embodiments, a steering system may be automatically re-centered based upon the determination 410 that the relevant vehicle has been de-rated (or has been de-rated in a particular way or with respect to a particular system).

In certain implementations, if the vehicle is determined 410 to be currently de-rated, the method 400 may include determining 402 that the vehicle is in a parked state based upon any number of additional indicators, but without requiring a particular duration of time for the indicators. For example, where a vehicle has been determined 410 to have been de-rated, a parked state may be determined 402 immediately (i.e., rather than after the time interval 408 noted above) based upon a determination 404 of a neutral-range orientation of a control handle or a determination 406 of an activation of a park switch.

To further support re-centering of a steering system, the method 400 may also include determining 420 the present orientation of a relevant steering device. For example, with respect to the vehicle 10c, the method 400 may include determining 420 the present orientation of the steering piston 52a. (It will be understood that for vehicles with differently configured steering devices, the orientation of other features may be determined.) The orientation of the piston 52a may be determined 420 in various ways. In certain embodiments, for example, an analog (or other) sensor such as a sensor 102 (see FIG. 5) may detect movement of (or movement caused by) the piston 52a. Signals corresponding to this movement may then be converted (e.g., by the controller 58) into values representing the displacement of the piston 52a from a previously sensed position, the position of the piston 52a relative to another reference orientation, or another indicator of the orientation of the piston 52a.

The determined 420 present orientation of the steering device may then be compared 424 with a neutral orientation of the steering device (e.g., a signal or value representing the present orientation subtracted from a signal or value representing the neutral orientation), in order to determine whether the steering device is appropriately centered. In certain implementations, as noted above, the neutral orientation of the steering device may be a centered orientation of the steering device (e.g., as with the piston 52a). It will be understood, however, that other configurations are possible, such that re-centering a steering system may not necessarily correspond to physical centering of a relevant steering device.

Based upon the comparison 424 of the present and neutral orientations of the steering device, the steering device may be moved 426 from the present orientation toward the neutral orientation. In certain embodiments, the steering device may be moved 426 based upon hydraulic flow through a relevant valve assembly, which flow may be controlled by various steering commands. With respect to the vehicle 10c, for example, the controller 58 may determine a target movement 426 of the piston 52a based upon the comparison 424 of the present and centered orientations of the piston 52a. Steering commands may then be provided by the controller 58 to various valves of the valve assembly 40a, such that the resulting hydraulic flow through the valve assembly 40a moves 426 the piston 52a towards its centered orientation.

In certain implementations, a range of orientations 422 of the steering device around the neutral orientation (e.g., a range of distances of the piston 52a from its centered orientation) may be predetermined. This determined range 422 may serve, for example, to bound a dead-band gap for control of the steering device, such that the device may not be moved 426 (or may be moved 426 to a lesser degree) for re-centering when the device is determined 420 to be within the range 422. As such, in certain implementations, the method 200 may include determining a range 422 of positions within a particular distance of a neutral position of the steering device (or a corresponding band-width of signals). Re-centering of the steering of the vehicle may then be implemented differently, depending on whether the steering device is determined 420 to be presently oriented within the relevant range. For example, if the steering device is determined 420 to be presently oriented within the predetermined range 422 around the neutral orientation, but is not presently at the neutral orientation, the steering device may be considered as almost being in its neutral orientation, such that substantial additional movement 426 of the steering device may be unnecessary. Accordingly, the method 400 may include moving 426 the steering device only for a predetermined time interval 428 (e.g., a relatively short time interval 428, such as 1 second). (It will be understood that the time interval 428 for providing 426 a steering command may be different than, or may be the same as, the time interval 408 to determine 404, 406 the state of a control handle or park switch.)

In contrast, if the steering device is determined 420 to be presently oriented outside of the predetermined range 422 around the neutral orientation, the steering device may appropriately be moved 426 (e.g., through steering commands provided to the valve assembly 40a) until the determined 420 present orientation is sufficiently close to the neutral orientation. For example, an initial set of commands to the valve assembly 40a may cause the piston 52a to move 426 over an extended time, until a sensor (e.g., sensor 102 in FIG. 5) indicates that the piston 52a is within a predetermined range 422 around the centered orientation. A subsequent set of commands to the valve assembly 40a may then cause the piston 52a to move 426 only for a limited, additional, predetermined time interval 428, before the steering commands are terminated. Such a strategy may, for example, cause the piston 52a to be moved 426 to within a close distance of its neutral position, without imposing substantial back and forth movement 426 around the neutral position (e.g., as the control system "hunts" for neutral).

In certain embodiments, the relevant steering device may be moved by successively smaller amounts 430 (or with successively smaller forces) as the steering device is determined to be approaching the neutral orientation. For example, as the piston 52a is determined 420 to be approaching its centered orientation, the controller 58 may provide successively smaller current signals to the various valves of the valve assembly 40a, such that the piston 52a is moved successively smaller amounts 430 by successively smaller hydraulic flows as the piston 52a nears center. This, and similar modulation of steering movements 426 may result in relatively smooth approach of the neutral orientation by the piston 52a (or another relevant steering device) and a less abrupt stop to the movement 426 of the steering device once an appropriately neutral orientation is reached.

In certain embodiments, various operations of the method 400 may be executed repeatedly in order to appropriately re-center a steering system. For example, after the present orientation of a steering device is determined 420 and the steering device moved 426 accordingly, a new present orientation of the steering device may be determined 420 and compared 424 with a neutral orientation in order to guide further movement 426 of the steering device.

In certain implementations, the method 400 may include stopping 444 control of steering (e.g., stopping 444 the automatic moving 426 of a steering device) or turning off 444 an engine if an inversion of steering commands is detected (e.g., as may result if hydraulic lines are inadvertently misconnected). As such, the method 400 may include determining 440 a target direction of movement 426 of a steering device. A target direction of movement may be determined 440, for example, based upon a steering command determined by a controller for the movement 426 of the steering device. The determined 440 target direction of movement may then be compared 442 to an actual direction of movement in order to determine whether the actual direction of movement corresponds to the determined 440 target direction. With respect to the vehicle 10c, for example, the movement of the piston 52a detected by the sensor 102 may be compared to the target movement determined 440 by the controller 58. If the target and actual movements do not match (e.g., are in opposite directions for at least a particular time interval), control of steering may be stopped 444 and the engine may be automatically turned off 444.

Figure 10:
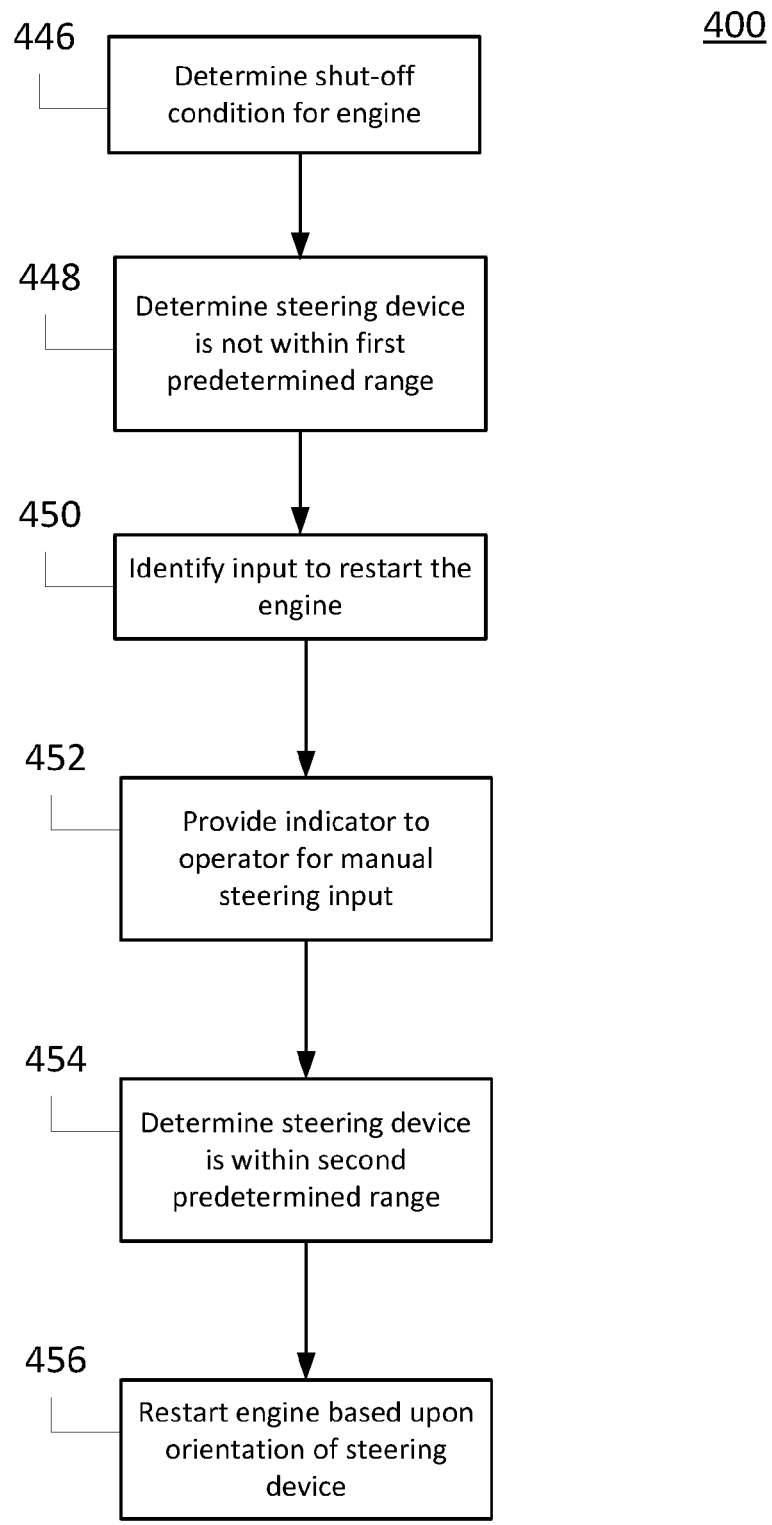
FIG. 10 is a diagrammatic view of further aspects of the steering control method of FIG. 9.

In certain implementations, the method 400 may also usefully guide manual re-centering of various steering systems. This may be useful, for example, if the engine of a vehicle is shut off (intentionally or otherwise) before an automatic re-centering of a steering system may be completed. Accordingly, referring also to FIG. 10, the method 400 may include determining 446 a shut-off condition for the engine of the relevant vehicle. An engine shut off may be determined 446 in various known ways, including via one or more sensors (not shown). The method 400 may then include determining 448 whether a relevant steering device has been moved 426 to an orientation that is within an appropriate range with respect to the neutral orientation (e.g., moved 426 to within particular distance from the neutral orientation). In certain embodiments, this determined 448 range may include orientations of the steering device that are disposed outside of the range 422.

If the steering device is determined 448 not to have been moved to within the appropriate distance from the neutral orientation, the steering device may be viewed as not being disposed at a neutral (i.e., zero-steer) orientation. For various reasons, it may be useful to prevent a restart of the engine (and a corresponding powering of a steering drive) until the steering device is further moved, such that the engine may be restarted only if the steering system is in a zero-steer state and any sudden movement of the vehicle upon engine restart may be in a non-turning direction. Accordingly, upon identifying 450 a restart input for restarting the engine (e.g., a turn of a key to a "run" position), the method 400 may include, before the engine is restarted, providing 452 an indicator to an operator to guide a manual steering input by the operator at the steering input device. With respect to the vehicle 10c, for example, the controller 58 may determine 448 that the piston 52a was not appropriately re-centered before the engine of the vehicle 10c was powered off. Upon the identification 450 of a restart input for the vehicle 10c (e.g., a turning of a relevant key to "run"), the actual restart of the engine may be delayed until the steering system has been appropriately re-centered.

In certain implementations, the method 200 may determine 440 a target direction of movement for the piston 52a (i.e., to re-center the steering device 52) and may provide 452 an indicator directing the operator to provide a particular manual input. For example, the controller 58 may provide 452 an indicator (e.g., an arrow or animated steering wheel) on a display device (not shown) in the vehicle 10c, which may indicate which direction the operator should turn the steering wheel 26. As the operator turns the steering wheel 26 (e.g., in accordance with the provided 452 indicator), the present orientation of the steering device may be determined 420 and compared 424 with the neutral orientation. An updated indicator may then be provided 452 as appropriate for further manual steering. Once the steering device has been determined 454 to have been moved to an orientation within a range of orientations around the neutral orientation, the steering device may be viewed as appropriately re-centered and the engine 36 may be restarted 456. In certain embodiments, the acceptable range of orientations for a steering device may be larger for a manual re-centering (e.g., as guided by the provided 452 indicators) than for a fully automated re-centering (e.g., as implemented via commands to the valve assembly 40a). For example, a steering device may be determined to be appropriately re-centered, after a manual re-centering operation, if the steering device is determined 454 to be within a particular range of orientations, which may be a larger range than the range 422 for automated re-centering of the steering device. This may, for example, allow for manual re-centering of a steering device, as guided by provided 452 indicators, without requiring an operator to orient the steering device with the same precision as in an automated re-centering.

Referring again to FIG. 5, in certain implementations, it may be useful to provide an on-off or other valve to prevent hydraulic flow from the manual valve 28 from influencing an automated re-centering operation (e.g., a moving 426 of the piston 52a based upon the various automated determinations 402, 404, 406, 410, 420, and so on). As depicted in FIG. 5, an on-off valve 106 is disposed at the valve assembly 40a in order to selectively control operation of the valve 40a (and other devices). In certain embodiments, a similar (or other) on-off valve (not shown) may be disposed at each of the flow lines 104 between the manual steering valve 28 and the piston 52a. When the piston 52a is being automatically moved 426 during automated re-centering of the front steering system, the two valves (not shown) on the lines 104 may be turned off (or otherwise closed), such that no flow may be routed from the valve 28 to the piston 52a.

As will be appreciated by one skilled in the art, certain aspects the disclosed subject matter may be embodied as a method, system (e.g., a work vehicle control system included in the various vehicles 10), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A steering system for an agricultural vehicle having one or more steerable front wheels and one or more steerable rear wheels, the steering system comprising:
    a hydraulic charge pressure circuit configured to provide charge pressure to one or more hydraulic components of the agricultural vehicle;
    a hydraulic drive pressure circuit configured to provide a working pressure to one or more other hydraulic components of the agricultural vehicle;
    at least one front hydraulic machine configured to rotate at least one of the one or more steerable front wheels in order to drive the agricultural vehicle; and
    wherein the at least one front hydraulic machine is driven to rotate the at least one steerable front wheel by the working pressure from the hydraulic drive pressure circuit; and
    wherein, to steer the agricultural vehicle, the at least one front hydraulic machine is controlled according to a flow of hydraulic fluid in the hydraulic charge pressure circuit.

2. The steering system of claim 1, further including a front valve assembly configured to control steering of the at least one steerable front wheel by controlling the at least one front hydraulic machine;
    wherein, to steer the agricultural vehicle, the front valve assembly controls the at least one front hydraulic machine by controlling flow of hydraulic fluid from the hydraulic charge pressure circuit through the front valve assembly.

3. The steering system of claim 2, wherein the front valve assembly is not in hydraulic communication with the hydraulic drive pressure circuit.

4. The steering system of claim 1, further comprising:
    a rear steering device configured to steer at least one of the one or more steerable rear wheels;
    a rear valve assembly configured to control the steering of the at least one steerable rear wheel by controlling the rear steering device; and
    a hydraulic steering pressure circuit configured to provide steering pressure to the rear steering device via the rear valve assembly, in order to operate the rear steering device;
    wherein the rear valve assembly controls the rear steering device by controlling flow of hydraulic fluid from the hydraulic steering pressure circuit through the rear valve assembly.

5. The steering system of claim 4, wherein the hydraulic steering pressure circuit is not in hydraulic communication with the hydraulic drive pressure circuit or the hydraulic charge pressure circuit.

6. The steering system of claim 4, wherein the rear valve assembly includes a blocker valve configured to selectively disable the rear valve assembly, a first pilot valve configured to operate the blocker valve, at least one control valve, and a second pilot valve configured to operate the at least one control valve;
    wherein the hydraulic steering pressure circuit provides steering pressure to the rear steering device via the blocker valve and the at least one control valve; and
    wherein the hydraulic charge pressure circuit provides charge pressure to the first and second pilot valves to operate the first and second pilot valves and thereby control flow of hydraulic fluid from the hydraulic steering pressure circuit through the blocker valve and the at least one control valve.

7. The steering system of claim 6, wherein the rear steering device includes a double-acting piston coupled to the at least one steerable rear wheel; and
    wherein the double-acting piston is configured to receive the flow of hydraulic fluid from the hydraulic steering pressure circuit through the blocker valve and the at least one control valve in order to steer the at least one steerable rear wheel.

8. The steering system of claim 4, wherein a steering pump for pressurizing the hydraulic steering pressure circuit is configured to provide steering pressure of between approximately 1200 and 3600 pounds per square inch.

9. The steering system of claim 2, wherein front valve assembly includes a blocker valve configured to selectively disable the front valve assembly, a first pilot valve configured to operate the blocker valve, at least one control valve, and a second pilot valve configured to operate the at least one control valve;
    wherein the front valve assembly controls the at least one front hydraulic machine by controlling flow of hydraulic fluid from the hydraulic charge pressure circuit through the blocker valve and the at least one control valve; and
    wherein the first and second pilot valves, respectively, use the charge pressure from the hydraulic charge pressure circuit to in order to control the flow from the hydraulic charge pressure circuit through the blocker valve and the at least one control valve.

10. The steering system of claim 9, wherein the at least one front hydraulic machine is configured to rotate the at least one steerable front wheel at a rotational speed that depends, at least in part, upon the flow of hydraulic fluid from the hydraulic charge pressure circuit through the blocker valve and the at least one control valve.

11. The steering system of claim 10, further comprising:
a double-acting piston in hydraulic communication with the front valve assembly;
wherein the flow of hydraulic fluid from the hydraulic charge pressure circuit through the blocker valve and the at least one control valve varies the rotational speed of the at least one steerable front wheel by moving the double-acting piston.

12. The steering system of claim 11, wherein a charge pump for pressurizing the hydraulic charge pressure circuit is configured to provide charge pressure of between approximately 150 and 700 pounds per square inch.

* * * * *